(12) United States Patent
Navon et al.

(10) Patent No.: US 12,361,410 B2
(45) Date of Patent: Jul. 15, 2025

(54) SOFTWARE ARCHITECTURE FOR EFFICIENT BLOCKCHAIN TRANSACTIONS

(71) Applicant: PayPal, Inc., San Jose, CA (US)

(72) Inventors: Alon Navon, Tel Aviv (IL); Lev Pachmanov, Tel Aviv (IL)

(73) Assignee: PAYPAL, INC., San Jose, CA (US)

( * ) Notice: Subject to any disclaimer, the term of this patent is extended or adjusted under 35 U.S.C. 154(b) by 815 days.

(21) Appl. No.: 17/551,631

(22) Filed: Dec. 15, 2021

(65) Prior Publication Data

US 2023/0186290 A1  Jun. 15, 2023

(51) Int. Cl.
G06Q 20/38 (2012.01)
G06Q 20/02 (2012.01)
G06Q 20/06 (2012.01)
G06Q 30/0251 (2023.01)

(52) U.S. Cl.
CPC ......... G06Q 20/3823 (2013.01); G06Q 20/02 (2013.01); G06Q 20/065 (2013.01); G06Q 20/3827 (2013.01); G06Q 30/0253 (2013.01)

(58) Field of Classification Search
CPC .............................................. G06Q 20/00–425
See application file for complete search history.

(56) References Cited

U.S. PATENT DOCUMENTS

| | | |
|---|---|---|
| 2020/0027089 A1 | 1/2020 | Kuchar et al. |
| 2020/0160326 A1 | 5/2020 | Sarin |
| 2021/0342825 A1 | 11/2021 | Le Calvez et al. |
| 2022/0091878 A1 * | 3/2022 | Wu ........................... H04L 9/50 |
| 2023/0052723 A1 * | 2/2023 | Dickson ............. G06Q 20/3672 |

FOREIGN PATENT DOCUMENTS

CN   112700240 A  *  4/2021

OTHER PUBLICATIONS

Igor Korsakov, "Bitcoin Replace-By-Fee guide: fix stuck transactions, do doublespends," Medium, available at: https://medium.com/@overtorment/bitcoin-replace-by-fee-guide-e10032f9a93f (Oct. 25, 2017) (Year: 2017).*

(Continued)

*Primary Examiner* — Mohammad A. Nilforoush
(74) *Attorney, Agent, or Firm* — HAYNES AND BOONE, LLP

(57) ABSTRACT

The present disclosure provides techniques for efficient blockchain transaction processing. In one embodiment, a computer system broadcasts a first transaction to a blockchain network for addition to a block in a blockchain. The computer system may broadcast a second transaction to the blockchain network for addition to the block in the blockchain, where the second transaction descends from the first transaction and includes a placeholder fee. The computer system monitors and determines that the first transaction has not been confirmed to the block in the blockchain for a duration of time (e.g., stuck in the mempool). In response to determining that the first transaction is stuck, the computer system may transmit a request to replace the placeholder fee with a transaction fee that is sufficiently high to cause the first transaction and the second transaction to be confirmed to a block in the blockchain, thereby unsticking the first transaction.

20 Claims, 15 Drawing Sheets

(56) References Cited

OTHER PUBLICATIONS

Machine Translation of Lai, S, et al., CN-112700240-A, Published Apr. 23, 2021. (Year: 2021).*
International Search Report and Written Opinion for Application No. PCT/US2022/050632 mailed on Mar. 10, 2023, 7 pages.
International Preliminary Report on Patentability for Application No. PCT/US2022/050632, mailed on Jun. 27, 2024, 6 pages.

* cited by examiner

SOFTWARE ARCHITECTURE FOR EFFICIENT BLOCKCHAIN TRANSACTIONS

TECHNICAL FIELD

The present specification generally relates to blockchain technology, and more specifically, to software architecture for efficient blockchain transactions according to various embodiments of the disclosure.

BACKGROUND

Blockchains have become a popular computer data structure for storing transaction data due to its inherent peer-to-peer and immutable characteristics. For example, blockchains have been used as a decentralized ledger to record transaction data associated with various cryptocurrencies, smart contracts, and other types of transaction data. Copies and/or parts of a blockchain can be stored across different computer nodes, where each computer node may be configured to validate transactions and add new transaction data to the blockchain. As a new transaction is conducted, one or more of the computer nodes may be configured to validate the new transaction (e.g., through a proof-of-work or a proof-of-stake mechanism, etc.). Once the new transaction is validated, the transaction data of the new transaction may be packaged into a block and appended to the copies of the blockchain by the one or more of the computer nodes.

However, as blockchain technology becomes more prevalent, the number of transactions on blockchain networks, such as Bitcoin, will steadily increase over time. As more transactions occur, more blocks are filled up. Since not all transactions can be included in the blockchain immediately, a backlog oftentimes forms in miners' mempools, which behave like somewhat of a transaction queue where miners may select transactions that pay the most fees and include the selected transactions in their blocks first. Transactions that include lower fees are outbid on the fee market and remain in miners' mempools until a new block is found. If the transaction is outbid again, it must wait until the next block, and so on and so forth. Transactions with too low of a fee may take hours or even days to confirm, and sometimes never confirm at all. Such transactions may be considered "stuck" in the mempool. The present disclosure provides techniques to unstick transactions that have become stuck.

Figure 1:
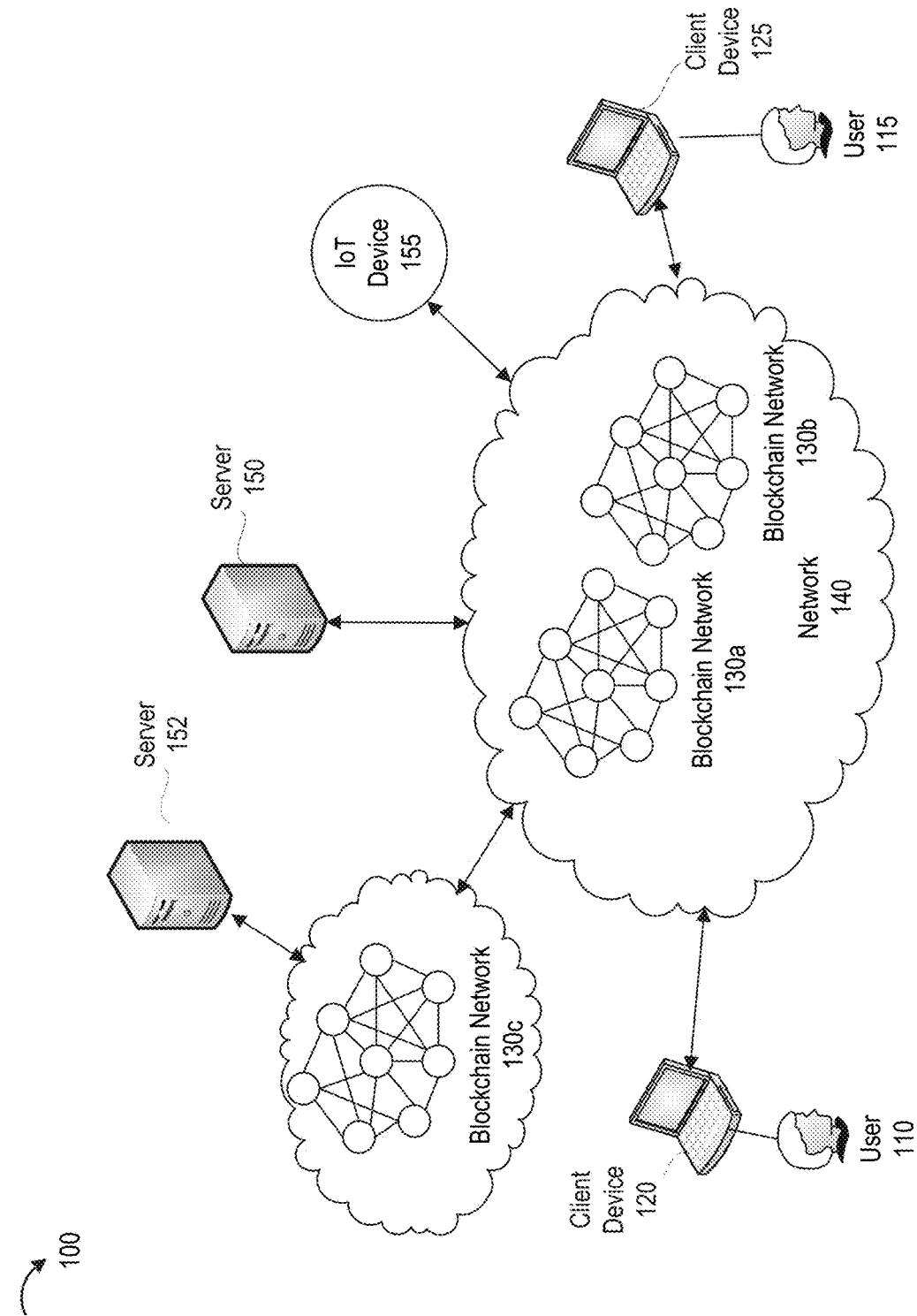
FIG. 1 illustrates an example computing architecture for facilitating one or more blockchain based transactions according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Blockchains

In its broadest sense, blockchain refers to a framework that supports a trusted ledger that is stored, maintained, and updated in a distributed manner in a peer-to-peer network. For example, in a cryptocurrency application, such as Bitcoin or Ethereum, Ripple, Dash, Litecoin, Dogecoin, zCash, Tether, Bitcoin Cash, Cardano, Stellar, EOS, NEO, NEM, Bitshares, Decred, Augur, Komodo, PIVX, Waves, Steem, Monero, Golem, Stratis, Bytecoin, Ardor, or in digital currency exchanges, such as Coinbase, Kraken, CEX.IO, Shapeshift, Poloniex, Bitstamp, Coinmama, Bisq, LocalBitcoins, Gemini and others, the distributed ledger represents each transaction where units of the cryptocurrency are transferred between entities. For example, using a digital currency exchange, a user may buy any value of digital currency or exchange any holdings in digital currencies into worldwide currency or other digital currencies. Each transaction can be verified by the distributed ledger and only verified transactions are added to the ledger. The ledger, along with many aspects of blockchain, may be referred to as "decentralized" in that a central authority is typically not present. Because of this, the accuracy and integrity of the ledger cannot be attacked at a single, central location. Modifying the ledger at all, or a majority thereof, at locations where it is stored is made difficult so as to protect the integrity of the ledger. This is due in large part to the individuals associated with the nodes that make up the peer-to-peer network having a vested interest in the accuracy of the ledger.

Though maintaining cryptocurrency transactions in the distributed ledger may be the most recognizable use of blockchain technology today, the ledger may be used in a variety of different fields. Indeed, blockchain technology is applicable to any application where data of any type may be accessed where the accuracy of the data is assured. For example, a supply chain may be maintained in a blockchain ledger, where the transfer of each component from party to party, and location to location, may be recorded in the ledger for later retrieval. Doing so allows for easier identification of a source for a defective part and where other such defective parts have been delivered. Similarly, food items may be tracked in like manner from farm to grocery store to purchaser.

Implementations of the present disclosure will now be described in detail with reference to the accompanying Figures.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Computer Architecture

As discussed above, the distributed ledger in a blockchain framework is stored, maintained, and updated in a peer-to-peer network. In one example the distributed ledger maintains a number of blockchain transactions. FIG. 1 shows an example system 100 for facilitating a blockchain transaction. The system 100 includes a first client device 120, a second client device 125, a first server 150, a second server 152, and an Internet of Things (IoT) device 155 interconnected via a network 140. The first client device 120, the second client device 125, the first server 150, and/or the second server 152 may be a computing device 1105 described in more detail with reference to FIG. 11. The IoT device 155 may comprise any of a variety of devices including vehicles, home appliances, embedded electronics, software, sensors, actuators, thermostats, light bulbs, door locks, refrigerators, RFID implants, RFID tags, pacemakers, wearable devices, smart home devices, cameras, trackers, pumps, POS devices, and stationary and mobile communication devices along with connectivity hardware configured to connect and exchange data. The network 140 may be any of a variety of available networks, such as the Internet, and represents a worldwide collection of networks and gateways to support communications between devices connected to the network 140. The system 100 may also comprise one or more distributed or peer-to-peer (P2P) networks, such as a first, second, and third blockchain networks 130a-c (generally referred to as blockchain networks 130). As shown in FIG. 1, the network 140 may comprise the first and second blockchain networks 130a and 130b. The third blockchain network 130c may be associated with a private blockchain as described below with reference to FIG. 2 and is connected to one or more servers, such as the server 152, and is thus, shown separately from the first and second blockchain networks 130a and 103b. Each blockchain network 130 may comprise a plurality of interconnected devices (or nodes) as described in more detail with reference to FIG. 2. As discussed above, a ledger, or blockchain, is a distributed database for maintaining a growing list of records comprising any type of information. A blockchain, as described in more detail with reference to FIG. 3, may be stored at least at multiple nodes (or devices) of the one or more blockchain networks 130.

In one example, a blockchain based transaction may generally involve a transfer of data or value between entities, such as the first user 110 of the first client device 120 and the second user 115 of the second client device 125 in FIG. 1. Each of the servers 150 and 152 may include one or more applications, for example, a transaction application configured to facilitate the transaction between the entities by utilizing a blockchain associated with one of the blockchain networks 130. As an example, the first user 110 may request or initiate a transaction with the second user 115 via a user application executing on the first client device 120. The transaction may be related to a transfer of value or data from the first user 110 to the second user 115. The first client device 120 may send a request of the transaction to the server 150. The first server 150 and/or the second server 152 may send the requested transaction to one of the blockchain networks 130 to be validated and approved as discussed below.

Blockchain Network

Figure 2:
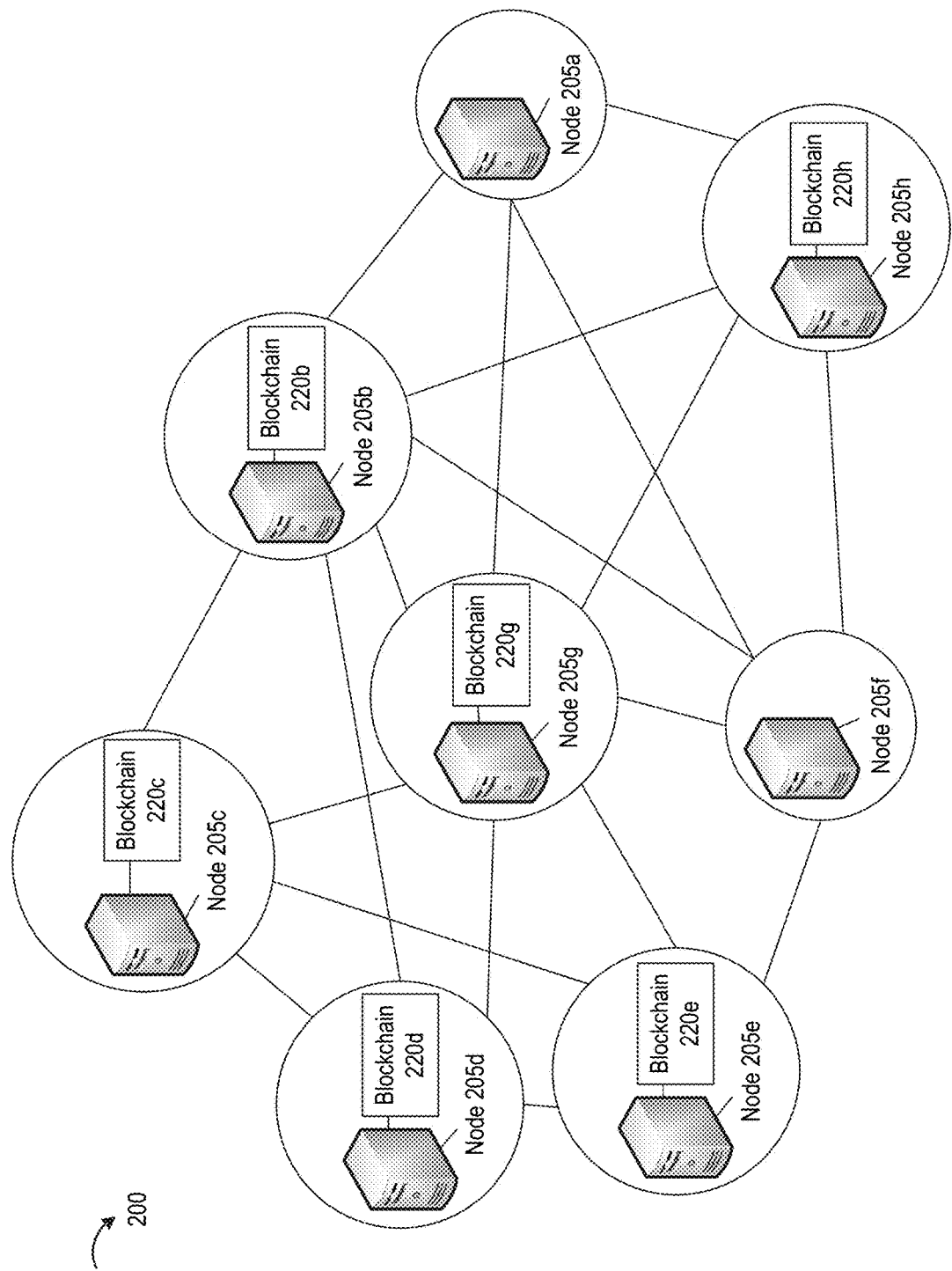
FIG. 2 illustrates an example blockchain network according to an embodiment of the present disclosure.

FIG. 2 shows an example blockchain network 200 comprising a plurality of interconnected nodes or devices 205a-h (generally referred to as nodes 205). Each of the nodes 205 may comprise a computing device 1105 described in more detail with reference to FIG. 11. Although FIG. 2 shows a single device for each of the nodes 205, each of the nodes 205 may comprise a plurality of devices (e.g., a pool). The blockchain network 200 may be associated with one or more blockchains 220a-h (generally referred to as blockchain 220). Some or all of the nodes 205 may replicate and save an identical copy of the blockchain 220. For example, FIG. 2 shows that the nodes 205b-e and 205g-h store copies of the blockchain 220. The nodes 205b-e and 205g-h may independently update their respective copies of the blockchain 220 as discussed below.

Blockchain Node Types

Blockchain nodes, for example, the nodes 205, may be full nodes or lightweight nodes. Full nodes, such as the nodes 205b-e and 205g-h, may act as a server in the blockchain network 200 by storing a copy of the entire blockchain 220 and ensuring that transactions posted to the blockchain 220 are valid. The full nodes 205b-e and 205g-h may publish new blocks on the blockchain 220. Lightweight nodes, such as the nodes 205a and 205f, may have fewer computing resources than full nodes. For example, IoT devices often act as lightweight nodes. The lightweight nodes may communicate with other nodes 205, provide the full nodes 205b-e and 205g-h with information, and query the status of a block of the blockchain 220 stored by the full nodes 205b-e and 205g-h. In this example, however, as shown in FIG. 2, the lightweight nodes 205a and 205f may not store a copy of the blockchain 220 and thus, may not publish new blocks on the blockchain 220.

Blockchain Network Types

The blockchain network 200 and its associated blockchain 220 may be public (permissionless), federated or consortium, or private. If the blockchain network 200 is public, then any entity may read and write to the associated blockchain 220. However, the blockchain network 200 and its associated blockchain 220 may be federated or consortium if controlled by a single entity or organization. Further, any of the nodes 205 with access to the Internet may be restricted from participating in the verification of transactions on the blockchain 220. The blockchain network 200 and its associated blockchain 220 may be private (permissioned) if access to the blockchain network 200 and the blockchain 220 is restricted to specific authorized entities, for example organizations or groups of individuals. Moreover, read permissions for the blockchain 220 may be public or restricted while write permissions may be restricted to a controlling or authorized entity.

Blockchain

Figure 3:
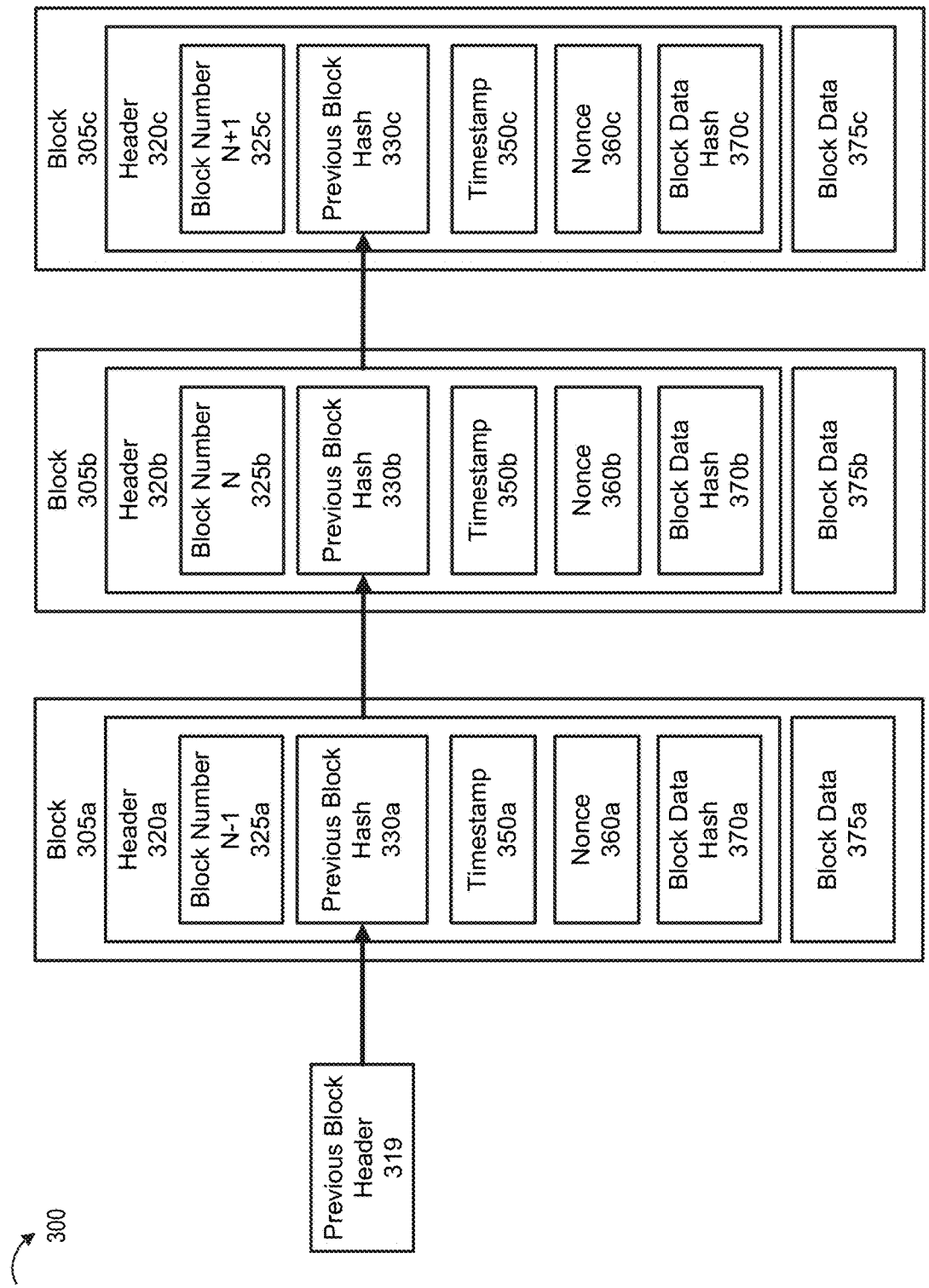
FIG. 3 illustrates an example blockchain according to an embodiment of the present disclosure.

As discussed above, a blockchain 220 may be associated with a blockchain network 200. FIG. 3 shows an example blockchain 300. The blockchain 300 may comprise a plurality of blocks 305a, 305b, and 305c (generally referred to as blocks 305). The blockchain 300 comprises a first block (not shown), sometimes referred to as the genesis block. Each of the blocks 305 may comprise a record of one or a plurality of submitted and validated transactions. The blocks 305 of the blockchain 300 may be linked together and cryptographically secured. In some cases, the post-quantum cryptographic algorithms that dynamically vary over time may be utilized to mitigate ability of quantum computing to break present cryptographic schemes. Examples of the various types of data fields stored in a blockchain block are provided below. A copy of the blockchain 300 may be stored locally, in the cloud, on grid, for example by the nodes 205b-e and 205g-h, as a file or in a database.

Blocks

Each of the blocks 305 may comprise one or more data fields. The organization of the blocks 305 within the blockchain 300 and the corresponding data fields may be implementation specific. As an example, the blocks 305 may comprise a respective header 320a, 320b, and 320c (generally referred to as headers 320) and block data 375a, 375b, and 375c (generally referred to as block data 375). The headers 320 may comprise metadata associated with their respective blocks 305. For example, the headers 320 may comprise a respective block number 325a, 325b, and 325c. As shown in FIG. 3, the block number 325a of the block 305a is N−1, the block number 325b of the block 305b is N, and the block number 325c of the block 305c is N+1. The headers 320 of the blocks 305 may include a data field comprising a block size, which may indicate the amount of data stored in a block (not shown). In some cases, the block size may be limited to a block size limit.

The blocks 305 may be linked together and cryptographically secured. For example, the header 320b of the block N (block 305b) includes a data field (previous block hash 330b) comprising a hash representation of the previous block N−1's header 320a. The hashing algorithm utilized for generating the hash representation may be, for example, a secure hashing algorithm 256 (SHA-256) which results in an output of a fixed length. In this example, the hashing algorithm is a one-way hash function, where it is computationally difficult to determine the input to the hash function based on the output of the hash function. Additionally, the header 320c of the block N+1 (block 305c) includes a data field (previous block hash 330c) comprising a hash representation of block N's (block 305b) header 320b.

The headers 320 of the blocks 305 may also include data fields comprising a hash representation of the block data, such as the block data hash 370a-c. The block data hash 370a-c may be generated, for example, by a Merkle tree and by storing the hash or by using a hash that is based on all of the block data. The headers 320 of the blocks 305 may comprise a respective nonce 360a, 360b, and 360c. In some implementations, the value of the nonce 360a-c is an arbitrary string that is concatenated with (or appended to) the hash of the block. The nonce 360 is generally solved for to mine a block. The headers 320 may comprise other data, such as a difficulty target.

The blocks 305 may comprise a respective block data 375a, 375b, and 375c (generally referred to as block data 375). The block data 375 may comprise a record of validated transactions that have also been integrated into the blockchain 200 via a consensus model (described below). As discussed above, the block data 375 may include a variety of different types of data in addition to validated transactions. Block data 375 may include any data, such as text, audio, video, image, or file, that may be represented digitally and stored electronically.

Blockchain Transaction

In one example, a blockchain based transaction may generally involve a transfer of data or value or an interaction between entities and described in more detail below. Referring back to FIG. 1, the first server 150 and/or the second server 152 may include one or more applications, for example, a transaction application configured to facilitate a blockchain transaction between entities. The entities may include users, devices, etc. The first user 110 may request or initiate a transaction with the second user 115 via a user application executing on the first client device 120. The transaction may be related to a transfer of value or data from the first user 110 to the second user 115. The value or data may represent money, a contract, property, records, rights, status, supply, demand, alarm, trigger, or any other asset that may be represented in digital form. The transaction may represent an interaction between the first user 110 and the second user 115.

Figure 4:
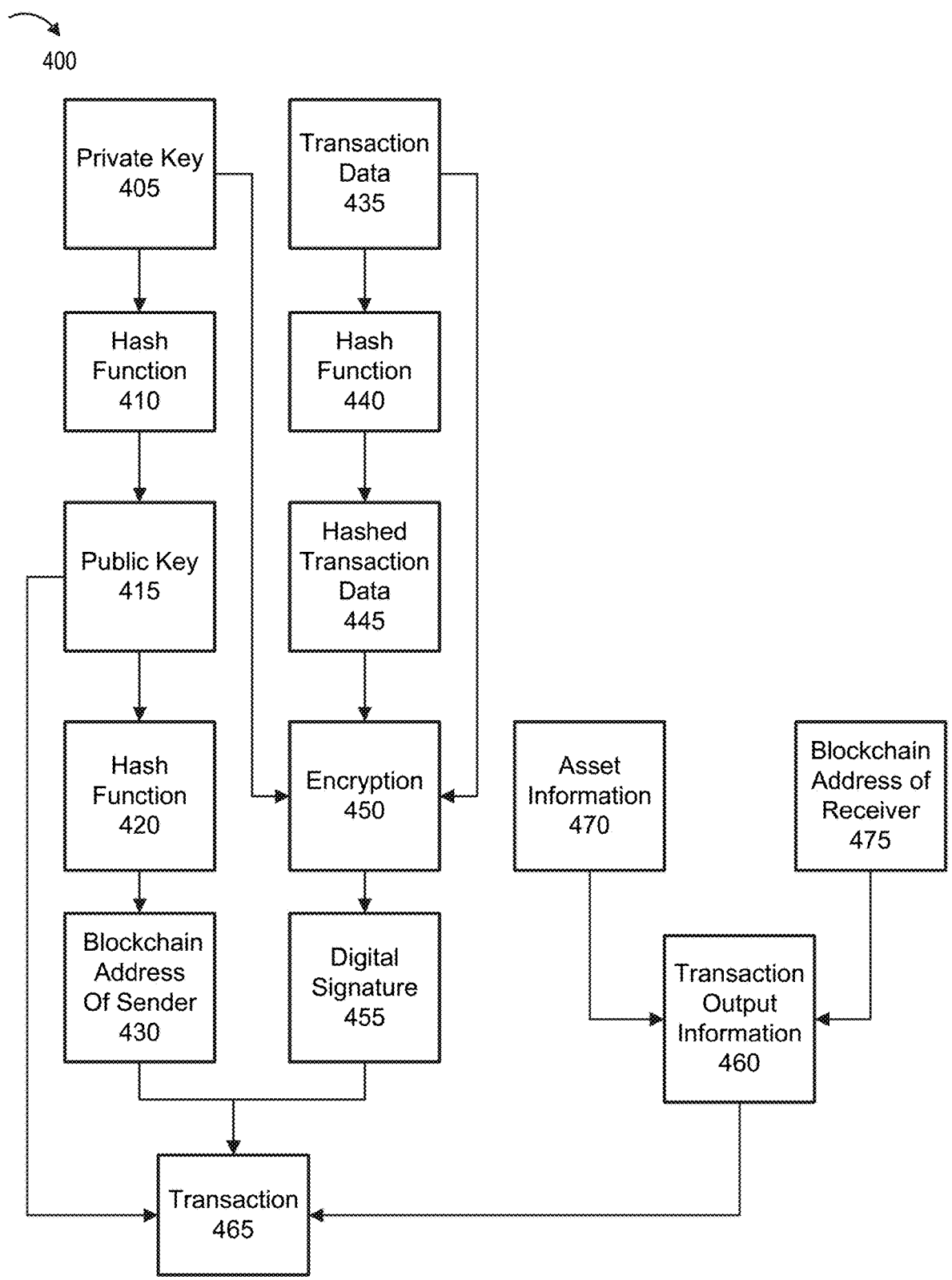
FIG. 4 is a diagram of an example transaction message according to an embodiment of the present disclosure.

FIG. 4 is a diagram of a transaction 465 generated by the transaction application. The transaction 465 may include a public key 415, a blockchain address 430 associated with the first user 110, a digital signature 455, and transaction output information 460. The transaction application may derive a public key 415 from a private key 405 of the first user 110 by applying a cryptographic hash function 410 to the private key 405. The cryptographic hash function 410 may be based on SHA-2 or SHA-3, although other cryptographic models may be utilized. More information about cryptographic algorithms may be found in Federal Information Processing Standards Publication (FIPS PUB 180-3), Secure Hash Standard. The transaction application may derive an address or identifier for the first user 110, such as the blockchain address 430, by applying a hash function 420 to the public key 415. Briefly, a hash function is a function that may be used for mapping arbitrary size data to fixed size data. The value may also be referred to as a digest, a hash value, a hash code, or a hash. In order to indicate that the first user 110 is the originator of the transaction 465, the transaction application may generate the digital signature 455 for the transaction data 435 using the private key 405 of the first user 110. The transaction data 435 may include information about the assets to be transferred and a reference to the sources of the assets, such as previous transactions in which the assets were transferred to the first user 110 or an identification of events that originated the assets. Generating the digital signature 455 may include applying a hash function 440 to the transaction data 435 resulting in hashed transaction data 445. The hashed transaction data 445 and the transaction data 435 may be encrypted (via an encryption function 450) using the private key 405 of the first user 110 resulting in the digital signature 455. The transaction output information 460 may include asset information 470 and an address or identifier for the second user 115, such as the blockchain address 475. The transaction 465 may be sent from the first client device 125 to the first server 150.

The specific type of cryptographic algorithm being utilized may vary dynamically based on various factors, such as a length of time, privacy concerns, etc. For example, the type of cryptographic algorithm being utilized may be changed yearly, weekly, daily, etc. The type of algorithms may also change based on varying levels of privacy. For example, an owner of content may implement a higher level of protection or privacy by utilizing a stronger algorithm.

Blockchain Addresses

A blockchain network may utilize blockchain addresses to indicate an entity using the blockchain or start and end points in the transaction. For example, a blockchain address for the first user 110, shown in FIG. 4 as the blockchain address of sender 430, may include an alphanumeric string of characters derived from the public key 415 of the first user 110 based on applying a cryptographic hash function 420 to the public key 415. The methods used for deriving the addresses may vary and may be specific to the implementation of the blockchain network. In some examples, a blockchain address may be converted into a QR code representation, barcode, token, or other visual representations or graphical depictions to enable the address to be optically scanned by a mobile device, wearables, sensors, cameras, etc. In addition to an address or QR code, there are many ways of identifying individuals, objects, etc. represented in a blockchain. For example, an individual may be identified through biometric information such as a fingerprint, retinal scan, voice, facial id, temperature, heart rate, gestures/movements unique to a person etc., and through other types of identification information such as account numbers, home address, social security number, formal name, etc.

Broadcasting Transaction

Figure 5:
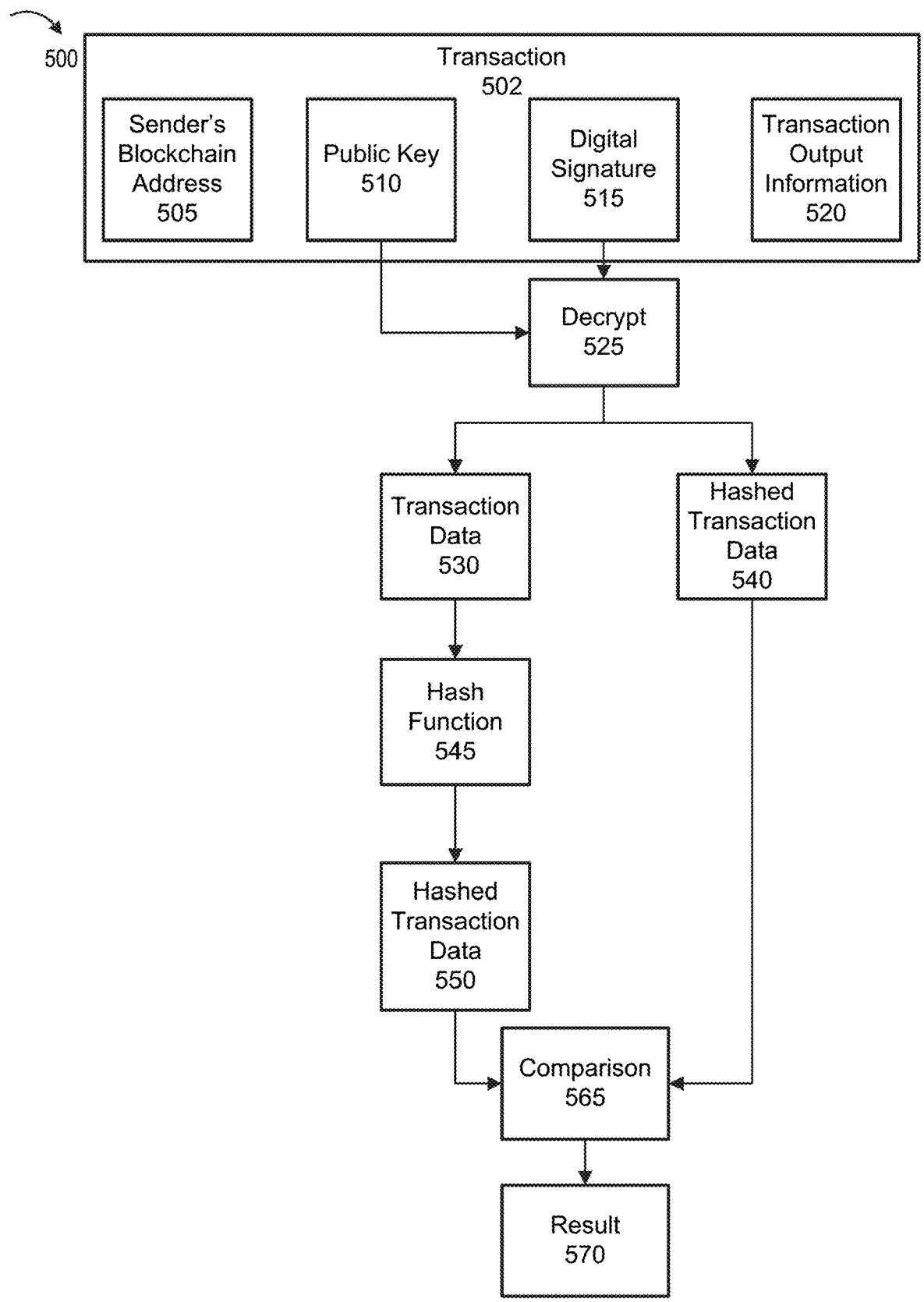
FIG. 5 shows an example transaction broadcast the blockchain network according to an embodiment of the present disclosure.

The first server 150 may receive transactions from users of the blockchain network 130. The transactions may be submitted to the first server 150 via desktop applications, smartphone applications, digital wallet applications, web services, or other software applications. The first server 150 may send or broadcast the transactions to the blockchain network 130. FIG. 5 shows an example transaction 502 broadcast by the server 150 to the blockchain network 130. The transaction 502 may be broadcast to multiple nodes 205 of the blockchain network 130. Typically, once the transaction 502 is broadcast or submitted to the blockchain network 130, it may be received by one or more of the nodes 205. Once the transaction 502 is received by the one or more nodes 205 of the blockchain network 130, it may be propagated by the receiving nodes 205 to other nodes 205 of the blockchain network 130.

A blockchain network may operate according to a set of rules. The rules may specify conditions under which a node may accept a transaction, a type of transaction that a node may accept, a type of compensation that a node receives for accepting and processing a transaction, etc. For example, a node may accept a transaction based on a transaction history, reputation, computational resources, relationships with service providers, etc. The rules may specify conditions for broadcasting a transaction to a node. For example, a transaction may be broadcasted to one or more specific nodes based on criteria related to the node's geography, dynamically modified or updated (e.g., turned on or off) to address issues such as latency, scalability and security conditions. A transaction may be broadcasted to a subset of nodes as a form of compensation to entities associated with those nodes (e.g., through receipt of compensation for adding a block of one or more transactions to a blockchain).

Transaction Validation—User Authentication and Transaction Data Integrity

Not all the full nodes 205 may receive the broadcasted transaction 502 at the same time, due to issues such as latency. Additionally, not all of the full nodes 205 that receive the broadcasted transaction 502 may choose to validate the transaction 502. A node 205 may choose to validate specific transactions, for example, based on transaction fees associated with the transaction 502. The transaction 502 may include a blockchain address 505 for the sender, a public key 510, a digital signature 515, and transaction output information 520. The node 205 may verify whether the transaction 502 is legal or conforms to a pre-defined set of rules. The node 205 may also validate the transaction 502 based on establishing user authenticity and transaction data integrity. User authenticity may be established by determining whether the sender indicated by the transaction 502 is in fact the actual originator of the transaction 502. User authenticity may be proven via cryptography, for example, asymmetric-key cryptography using a pair of keys, such as a public key and a private key. Additional factors may be considered when establishing user authenticity, such as user reputation, market conditions, history, transaction speed, etc. Data integrity of the transaction 502 may be established by determining whether the data associated with the transaction 502 was modified in any way. Referring back to FIG. 4, when the transaction application creates the transaction 465, it may indicate that the first user 110 is the originator of the transaction 465 by including the digital signature 455.

The node 205 may decrypt the digital signature 515 using the public key 510. A result of the decryption may include hashed transaction data 540 and transaction data 530. The node 205 may generate hashed transaction data 550 based on applying a hash function 545 to the transaction data 530. The node 205 may perform a comparison 565 between the first hashed transaction data 540 and the second hashed transaction data 550. If the result 570 of the comparison 565 indicates a match, then the data integrity of the transaction 502 may be established and node 205 may indicate that the transaction 502 has been successfully validated. Otherwise, the data of the transaction 502 may have been modified in some manner and the node 205 may indicate that the transaction 502 has not been successfully validated.

Each full node 205 may build its own block and add validated transactions to that block. Thus, the blocks of different full nodes 205 may comprise different validated transactions. As an example, a full node 205a may create a first block comprising transactions "A," "B," and "C." Another full node 205b may create a second block comprising transactions "C," "D," and "E." Both blocks may include valid transactions. However, only one block may get added to the blockchain, otherwise the transactions that the blocks may have in common, such as transaction "C" may be recorded twice leading to issues such as double-spending when a transaction is executed twice. One problem that may be seen with the above example is that transactions "C," "D," and "E" may be overly delayed in being added to the blockchain. This may be addressed a number of different ways as discussed below.

Securing Keys

Private keys, public keys, and addresses may be managed and secured using software, such as a digital wallet. Private keys may also be stored and secured using hardware. The digital wallet may also enable the user to conduct transactions and manage the balance. The digital wallet may be stored or maintained online or offline, and in software or hardware or both hardware and software. Without the public/private keys, a user has no way to prove ownership of assets. Additionally, anyone with access to a user's public/private keys may access the user's assets. While the assets may be recorded on the blockchain, the user may not be able to access them without the private key.

Tokens

A token may refer to an entry in the blockchain that belongs to a blockchain address. The entry may comprise information indicating ownership of an asset. The token may represent money, a contract, property, records, access rights, status, supply, demand, alarm, trigger, reputation, ticket, or any other asset that may be represented in digital form. For example, a token may refer to an entry related to cryptocurrency that is used for a specific purpose or may represent ownership of a real-world asset, such as Fiat currency or real-estate. Token contracts refer to cryptographic tokens that represent a set of rules that are encoded in a smart contract. The person that owns the private key corresponding to the blockchain address may access the tokens at the address. Thus, the blockchain address may represent an identity of the person that owns the tokens. Only the owner of the blockchain address may send the token to another person. The tokens may be accessible to the owner via the owner's wallet. The owner of a token may send or transfer the token to a user via a blockchain transaction. For example, the owner may sign the transaction corresponding to the transfer of the token with the private key. When the token is received by the user, the token may be recorded in the blockchain at the blockchain address of the user.

Establishing User Identity

While a digital signature may provide a link between a transaction and an owner of assets being transferred, it may not provide a link to the real identity of the owner. In some cases, the real identity of the owner of the public key corresponding to the digital signature may need to be established. The real identity of an owner of a public key may be verified, for example, based on biometric data, passwords, personal information, etc. Biometric data may comprise any physically identifying information such as fingerprints, face and eye images, voice sample, DNA, human movement, gestures, gait, expressions, heart rate characteristics, temperature, etc.

Publishing and Validating a Block

As discussed above, full nodes 205 may each build their own blocks that include different transactions. A node may build a block by adding validated transactions to the block until the block reaches a certain size that may be specified by the blockchain rules. However, only one of the blocks may be added to the blockchain. The block to be added to the blockchain and the ordering of the blocks may be determined based on a consensus model. In a proof of work model, nodes may compete to add their respective block to the blockchain by solving a complex mathematical puzzle. For example, such a puzzle may include determining a nonce 360, as discussed above, such that a hash (using a predetermined hashing algorithm) of the block to be added to the blockchain (including the nonce) has a value that meets a range limitation (e.g., a certain number of leading zeros in the hash). If two or more nodes solve the puzzle at the same time, then a "fork" may be created. When a full node 205 solves the puzzle, it may publish its block to be validated by the validation nodes 205 of the blockchain network 130.

In a proof of work consensus model, a node validates a transaction, for example, by running a check or search through the current ledger stored in the blockchain. The node will create a new block for the blockchain that will include the data for one or more validated transactions (see, e.g., block 375 of FIG. 3). In a blockchain implementation such as Bitcoin, the size of a block is constrained. Referring back to FIG. 3, in this example, the block will include a Previous Block Hash 330 representing a hash of what is currently the last block in the blockchain. The block may also include a hash 370 of its own transaction data (e.g., a so-called Merkle hash). According to a particular algorithm, all or selected data from the block may be hashed to create a final hash value. According to an embodiment of the proof of work model, the node will seek to modify the data of the block so that the final hash value is meets pre-set criteria (e.g., is less than a preset value, has a certain number of leading zeros, etc.). This is achieved through addition of a data value referred to as a nonce 360. Because final hash values cannot be predicted based on its input, it is not possible to compute an appropriate value for the nonce 360 that will result in a final hash value that meets the pre-set criteria. Accordingly, in this embodiment, a computationally intensive operation is needed at the node to determine an appropriate nonce value through a "brute force" trial-and-error method. Once a successful nonce value is determined, the completed block is published to the blockchain network for validation.

If validated by a majority of the nodes in the blockchain network, the completed block is added to the blockchain at each participating node. When a node's block is not added to the blockchain, the block is discarded and the node proceeds to build a new block. The transactions that were in the discarded block may be returned to a queue (e.g., mempool) and wait to be added to a next block. When a transaction is discarded or returned to the queue, the assets associated with the discarded transaction are not lost, since a record of the assets will exist in the blockchain. However, when a transaction is returned to the queue, it causes a delay in completing the transaction. Reducing the time to complete a transaction may be important. A set of blockchain rules, or renumeration/compensation for a node to process the returned transaction may determine how a returned transaction is to be treated going forward. When a transaction is put into a pool, then it can have a priority level but then a rule may indicate that the transaction priority level must exceed a threshold level. The priority level of a returned or discarded transaction may be increased. Another way to reduce the time to complete a transaction is to have the system, service provider, participant in the transaction, or merchant pay additional incentive for nodes to process a returned transaction. As an example, a service provider may identify a network of preferred miners based on geography or based on a volume discount perspective. The time to complete a transaction may be optimized by routing a returned transaction to specific preferred nodes. A transaction may be associated with an address that limits which of the preferred nodes will get to process the transaction if it is returned due to its inclusion in a discarded block. A value may be associated with the transaction so that it goes to preferred miners in a specific geographic location. Additionally, returned transactions may be processed based on pre-set rules. For example, a rule may indicate a commitment to process a specific number of returned transactions to receive additional incentive or compensation.

Blockchain Confirmations

After a block comprising a transaction is added to a blockchain, a blockchain confirmation may be generated for the transaction. The blockchain confirmation may be a number of blocks added to the blockchain after the block that includes the transaction. For example, when a transaction is broadcasted to the blockchain, there will be no blockchain confirmations associated with the transaction. If the transaction is not validated, then the block comprising the transaction will not be added to the blockchain and the transaction will continue to have no blockchain confirmations associated with it. However, if a block comprising the transaction is validated, then each of the transactions in the block will have a blockchain confirmation associated with the transaction. Thus, a transaction in a block will have one blockchain confirmation associated with it when the block is validated. When the block is added to the blockchain, each of the transactions in the block will have two blockchain confirmations associated with it. As additional validated blocks are added to the blockchain, the number of blockchain confirmations associated with the block will increase. Thus, the number of blockchain confirmations associated with a transaction may indicate a difficulty of overwriting or reversing the transaction. A higher valued transaction may require a larger number of blockchain confirmations before the transaction is executed.

Consensus Models

As discussed above, a blockchain network may determine which of the full nodes 205 publishes a next block to the blockchain. In a permissionless blockchain network, the nodes 205 may compete to determine which one publishes the next block. A node 205 may be selected to publish its block as the next block in the blockchain based on a consensus model. For example, the selected or winning node 205 may receive a reward, such as a transaction fee, for publishing its block, for example. Various consensus models may be used, for example, a proof of work model, a proof of stake model, a delegated proof of stake model, a round robin model, proof of authority or proof of identity model, and proof of elapsed time model.

In a proof of work model, a node may publish the next block by being the first to solve a computationally intensive mathematical problem (e.g., the mathematical puzzle described above). The solution serves as "proof" that the node expended an appropriate amount of effort in order to publish the block. The solution may be validated by the full nodes before the block is accepted. The proof of work model, however, may be vulnerable to a 51% attack described below.

The proof of stake model is generally less computationally intensive than the proof of work model. Unlike the proof of work model which is open to any node having the computational resources for solving the mathematical problem, the proof of stake model is open to any node that has a stake in the system. The stake may be an amount of cryptocurrency that the blockchain network node (user) may have invested into the system. The likelihood of a node publishing the next block may be proportional to its stake. Since this model utilizes fewer resources, the blockchain may forego a reward as incentive for publishing the next block.

The round robin model is generally used by permissioned blockchain networks. Using this model, nodes may take turns to publish new blocks.

In the proof of elapsed time model, each publishing node requests a wait time from a secure hardware within their computer system. The publishing node may become idle for the duration of the wait time and then creates and publishes a block to the blockchain network. As an example, in cases where there is a need for speed and/or scalability (e.g., in the context of a corporate environment), a hybrid blockchain network may switch to be between completely or partially permissioned and permissionless. The network may switch based on various factors, such as latency, security, market conditions, etc.

Forks

As discussed above, consensus models may be utilized for determining an order of events on a blockchain, such as which node gets to add the next block and which node's transaction gets verified first. When there is a conflict related to the ordering of events, the result may be a fork in the blockchain. A fork may cause two versions of the blockchain to exist simultaneously. Consensus methods generally resolve conflicts related to the ordering of events and thus, prevent forks from occurring. In some cases, a fork may be unavoidable. For example, with a proof of work consensus model, only one of the nodes competing to solve a puzzle may win by solving its puzzle first. The winning node's block is then validated by the network. If the winning node's block is successfully validated by the network, then it will be the next block added to the blockchain. However, it may be the case that two nodes may end up solving their respective puzzles at the same time. In such a scenario, the blocks of both winning nodes may be broadcast to the network. Since different nodes may receive notifications of a different winning node, the nodes that receive notification of the first node as the winning node may add the first node's block to their copy of the blockchain. Nodes that receive notification of the second node as the winning node may add the second node's block to their copy of the blockchain. This results in two versions of the blockchain or a "fork." This type of fork may be resolved by the longest chain rule of the proof of work consensus model. According to the longest chain rule, if two versions of the blockchain exist, then the chain with a larger number of blocks may be considered to be the valid blockchain. The other version of the blockchain may be considered as invalid and discarded or orphaned. Since the blocks created by different nodes may include different transactions, a fork may result in a transaction being included in one version of the blockchain and not the other. The transactions that are in a block of a discarded blockchain may be returned to a queue and wait to be added to a next block.

In some cases, forks may result from changes related to the blockchain implementation, for example, changes to the blockchain protocols and/or software. Forks may be more disruptive for permissionless and globally distributed blockchain networks than for private blockchain networks due to their impact on a larger number of users. A change or update to the blockchain implementation that is backwards compatible may result in a soft fork. When there is a soft fork, some nodes may execute an update to the blockchain implementation while other nodes may not. However, nodes that do not update to the new blockchain implementation may continue to transact with updated nodes.

A change to the blockchain implementation that is not backwards compatible may result in a hard fork. While hard forks are generally intentional, they may also be caused by unintentional software bugs/errors. In such a case, all publishing nodes in the network may need to update to the new blockchain implementation. While publishing nodes that do not update to the new blockchain implementation may continue to publish blocks according to the previous blockchain implementation, these publishing nodes may reject blocks created based on the new blockchain implementation and continue to accept blocks created based on the previous blockchain implementation. Therefore, nodes on different hard fork versions of the blockchain may not be able to interact with one another. If all nodes move to the new blockchain implementation, then the previous version may be discarded or abandoned. However, it may not be practical or feasible to update all nodes in the network to a new blockchain implementation, for example, if the update invalidates specialized hardware utilized by some nodes.

Blockchain-Based Application: Cryptocurrency

Cryptocurrency is a medium of exchange that may be created and stored electronically in a blockchain, such as a the blockchain 130a in FIG. 1. Bitcoin is one example of cryptocurrency, however there are several other cryptocurrencies. Various encryption techniques may be used for creating the units of cryptocurrency and verifying transactions. As an example, the first user 110 may own 10 units of a cryptocurrency. The blockchain 130a may include a record indicating that the first user 110 owns the 10 units of cryptocurrency. The first user 110 may initiate a transfer of the 10 units of cryptocurrency to the second user 115 via a wallet application executing on the first client device 120. The wallet application may store and manage a private key of the first user 110. Examples of the wallet device include a personal computer, a laptop computer, a smartphone, a personal data assistant (PDA), etc.

Figure 6A:
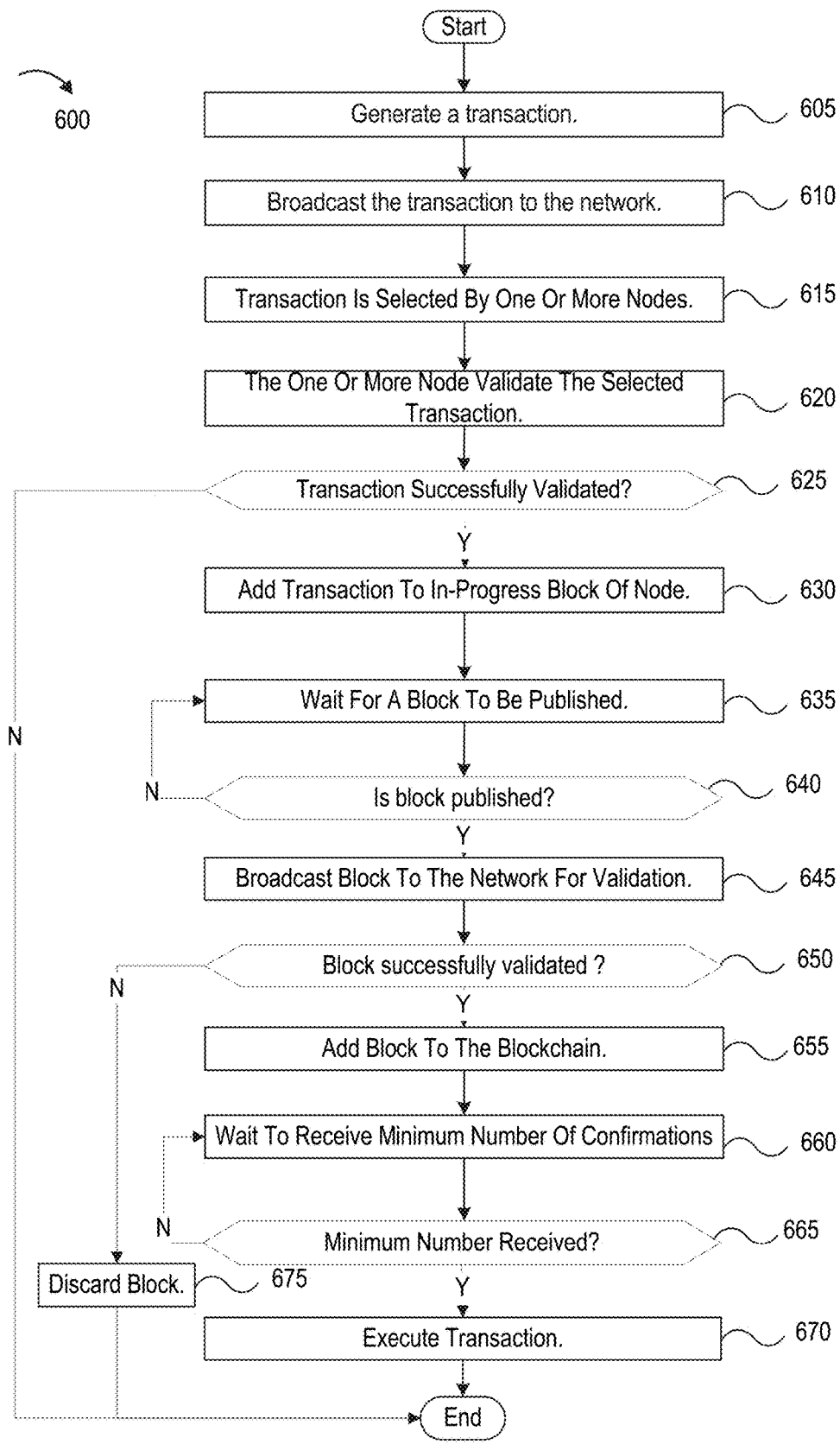
FIG. 6A is a flowchart showing an example process for performing a blockchain based transaction according to an embodiment of the present disclosure.

FIG. 6A is a flow diagram showing steps of an example method 600 for performing a blockchain transaction between entities, such as the first user 110 of the first client device 120 and the second user 115 of the second client device 125 in FIG. 1. The steps of the method 600 may be performed by any of the computing devices shown in FIG. 1. Alternatively or additionally, some or all of the steps of the method 600 may be performed by one or more other computing devices. Steps of the method 600 may be modified, omitted, and/or performed in other orders, and/or other steps may be added.

At step 605, the wallet application may generate transaction data for transferring the 10 units of cryptocurrency from the first user 110 to the second user 120. The wallet application may generate a public key for the transaction using the private key of the first user 110. In order to indicate that the first user 110 is the originator of the transaction, a digital signature may also be generated for the transaction using the private key of the first user 110. As discussed with reference to FIG. 4, the transaction data may include information, such as a blockchain address of the sender 430, the digital signature 455, transaction output information 460, and the public key of the sender 415. The transaction data may be sent to the first server 150 from the first client device 125.

The first server 150 may receive the transaction data from the first client device 125. At step 610, the first server 150 may broadcast the transaction to the blockchain network 130a. The transaction may be received by one or more nodes 205 of the blockchain network 130a. At step 615, upon receiving the transaction, a node 205 may choose to validate the transaction, for example, based on transaction fees associated with the transaction. If the transaction is not selected for validation by any of the nodes 205, then the transaction may be placed in a queue and wait to be selected by a node 205.

At step 620, each of the nodes 205 that selected the transaction may validate the transaction. Validating the transaction may include determining whether the transaction is legal or conforms to a pre-defined set of rules for that transaction, establishing user authenticity, and establishing transaction data integrity. At step 625, if the transaction is successfully validated by a node 205, the validated transaction is added to a block being constructed by that node 205 (step 630). As discussed above, since different nodes 205 may choose to validate different transactions, different nodes 205 may build or assemble a block comprising different validated transactions. Thus, the transaction associated with the first user 110 transferring 10 units of cryptocurrency to the second user 115 may be included in some blocks and not others.

At step 635, the blockchain network 130a may wait for a block to be published. Validated transactions may be added to the block being assembled by a node 205 until it reaches a minimum size specified by the blockchain or a block size limit. If the blockchain network 130a utilizes a proof of work consensus model, then the nodes 205 may compete for the right to add their respective blocks to the blockchain by solving a complex mathematical puzzle. The node 205 that solves its puzzle first wins the right to publish its block. As compensation, the winning node may be awarded a transaction fee associated with the transaction (e.g., from the wallet of the first user 110). Alternatively, or in addition, the winning node may be awarded compensation as an amount of cryptocurrency added to an account associated with the winning node from the blockchain network (e.g., "new" units of cryptocurrency entering circulation). This latter method of compensation and releasing new units of cryptocurrency into circulation is sometimes referred to as "mining." At step 640, if a block has not been published, then the process 600 returns to step 635 and waits for a block to be published. However, at step 640, if a block has been published, then the process 600 proceeds to step 645.

At step 645, the published block is broadcast to the blockchain network 130a for validation. At step 650, if the block is validated by a majority of the nodes 205, then at step 655, the validated block is added to the blockchain 220. However, at step 650, if the block is not validated by a majority of the nodes 205, then the process 600 proceeds to step 675. At step 675, the block is discarded and the transactions in the discarded block are returned back to the queue. The transactions in the queue may be selected by one or more nodes 205 for the next block. The node 205 that built the discarded block may build a new next block.

At step 660, if the transaction was added to the blockchain 220, the server 150 may wait to receive a minimum number of blockchain confirmations for the transaction. At step 665, if the minimum number of confirmations for the transaction have not been received, then the process may return to step 660. However, if at step 665, the minimum number of confirmations have been received, then the process proceeds to step 670. At step 670, the transaction may be executed and assets from the first user 110 may be transferred to the second user 115. For example, the 10 units of cryptocurrency owned by the first user 110 may be transferred from a financial account of the first user 110 to a financial account of the second user 115 after the transaction receives at least three confirmations.

Smart Contracts

A smart contract is an agreement that is stored in a blockchain and automatically executed when the agreement's predetermined terms and conditions are met. The terms and conditions of the agreement may be visible to other users of the blockchain. When the pre-defined rules are satisfied, then the relevant code is automatically executed. The agreement may be written as a script using a programming language such as Java, C++, JavaScript, VBScript, PHP, Perl, Python, Ruby, ASP, Tcl, etc. The script may be uploaded to the blockchain as a transaction on the blockchain.

As an example, the first user 110 (also referred to as tenant 110) may rent an apartment from the second user 115 (also referred to as landlord 115). A smart contract may be utilized between the tenant 110 and the landlord 115 for payment of the rent. The smart contract may indicate that the tenant 110 agrees to pay next month's rent of $1000 by the 28$^{th}$ of the current month. The agreement may also indicate that if the tenant 110 pays the rent, then the landlord 115 provides the tenant 110 with an electronic receipt and a digital entry key to the apartment. The agreement may also indicate that if the tenant 110 pays the rent by the 28$^{th}$ of the current month, then on the last day of the current month, both the entry key and the rent are released respectively to the tenant 110 and the landlord 115.

Figure 6B:
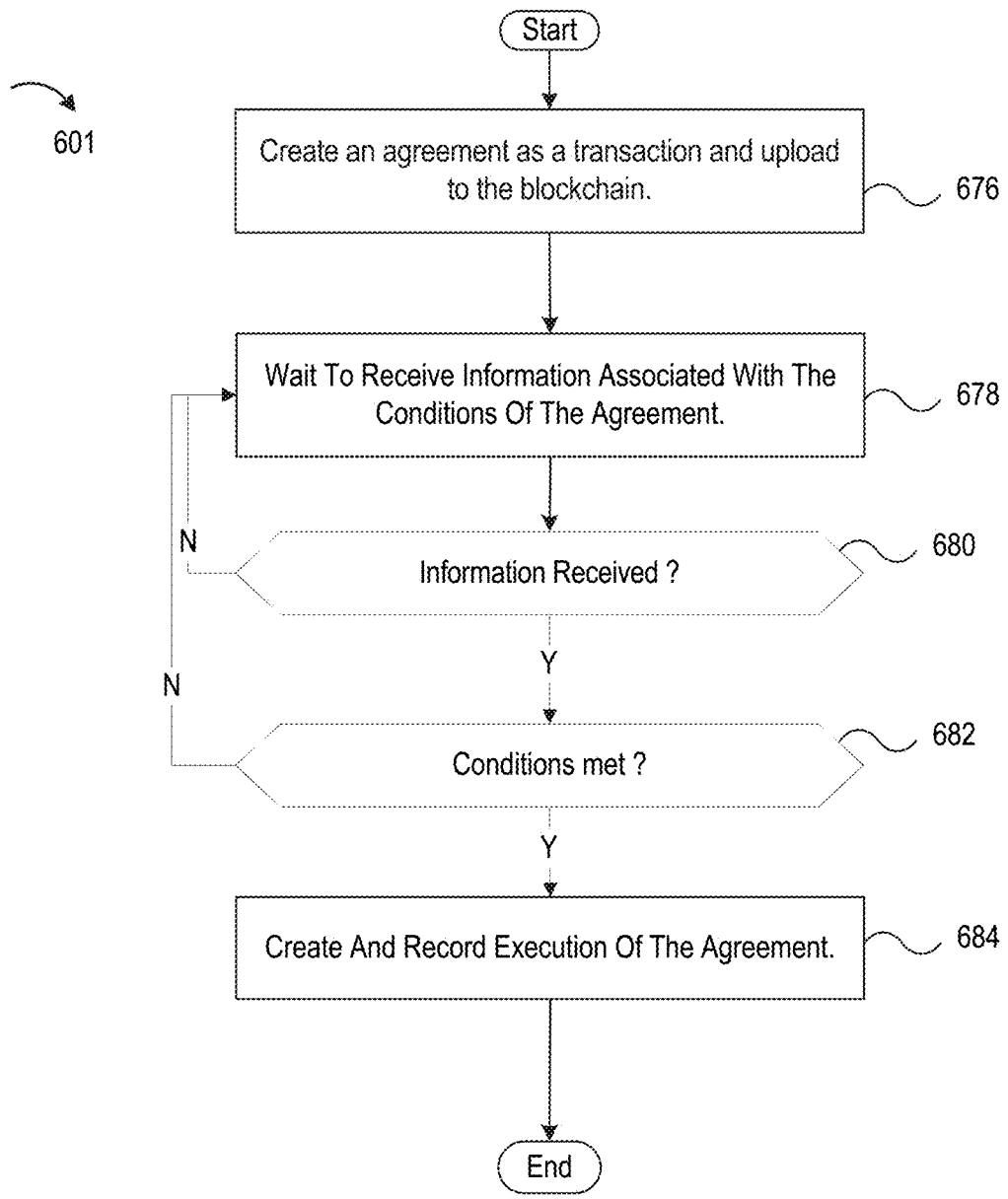
FIG. 6B is a flowchart showing another example process for performing a blockchain based transaction according to an embodiment of the present disclosure.

FIG. 6B is a flow diagram showing steps of an example method 601 for performing a smart contract transaction between entities, such as the tenant 110 and the landlord 115. The steps of the method 601 may be performed by any of the computing devices shown in FIG. 1. Alternatively or additionally, some or all of the steps of the method 601 may be performed by one or more other computing devices. Steps of the method 601 may be modified, omitted, and/or performed in other orders, and/or other steps may be added.

At step 676, the agreement or smart contract between the tenant 110 and the landlord 115 may be created and then submitted to the blockchain network 130a as a transaction. The transaction may be added to a block that is mined by the nodes 205 of the blockchain network 130a, the block comprising the transaction may be validated by the blockchain network 130a and then recorded in the blockchain 220 (as shown in steps 610-655 in FIG. 6A). The agreement associated with the transaction may be given a unique address for identification.

At step 678, the process 601 waits to receive information regarding the conditions relevant for the agreement. For example, the process 601 may wait to receive notification that $1000 was sent from a blockchain address associated with the tenant 110 and was received at a blockchain address associated with the landlord 115 by the 28$^{th}$ of the current month. At step 680, if such a notification is not received, then the process 601 returns to step 678. However, if at step 680, a notification is received, then the process 601 proceeds to step 682.

At step 682, based on determining that the received notification satisfies the conditions needed to trigger execution of the various terms of the smart contract, the process 601 proceeds to step 684. However, at step 682, if it is determined that the received notification does not satisfy the conditions needed to trigger execution of the smart contract, then the process 601 returns to step 678. At step 684, the process 601 creates and records a transaction associated with execution of the smart contract. For example, the transaction may include information of the payment received, the date the payment was received, an identification of the tenant 110 and an identification of the landlord 115. The transaction may be broadcast to the blockchain network 130a and recorded in the blockchain 220 (as shown in steps 610-655 of the process 600 of FIG. 6A). If the transaction is successfully recorded in the blockchain 220, the transaction may be executed. For example, if the payment was received on the 28$^{th}$, then an electronic receipt may be generated and sent to the tenant 110. However, on the last day of the current month, both the digital entry key and the rent are released respectively to the tenant 110 and the landlord 115.

Smart contracts may execute based on data received from entities that are not on the blockchain or off-chain resources. For example, a smart contract may be programmed to execute if a temperature reading from a smart sensor or IoT sensor falls below 10 degrees. Smart contracts are unable to pull data from off-chain resources. Instead, such data needs to be pushed to the smart contract. Additionally, even slight variations in data may be problematic since the smart contract is replicated across multiple nodes of the network. For example, a first node may receive a temperature reading of 9.8 degrees and a second node may receive a temperature reading of 10 degrees. Since validation of a transaction is based on consensus across nodes, even small variations in the received data may result in a condition of the smart contract to be evaluated as being not satisfied. Third party services may be utilized to retrieve off-chain resource information and push this to the blockchain. These third-party services may be referred to as oracles. Oracles may be software applications, such as a big data application, or hardware, such as an IoT or smart device. For example, an oracle service may evaluate received temperature readings beforehand to determine if the readings are below 10 degrees and then push this information to the smart contract. However, utilizing oracles may introduce another possible point of failure into the overall process. Oracles may experience errors, push incorrect information or may even go out of business.

Since blockchains are immutable, amending or updating a smart contract that resides in a blockchain may be challenging and thus, more expensive and/or more restrictive than with text-based contracts.

Internet of Things (IoT)

An IoT network may include devices and sensors that collect data and relay the data to each other via a gateway. The gateway may translate between the different protocols of the devices and sensors as well as manage and process the data. IoT devices may, for example, collect information from their environments such as motions, gestures, sounds, voices, biometric data, temperature, air quality, moisture, and light. The collected information sent over the Internet for further processing. Typically, IoT devices use a low power network, Bluetooth, Wi-Fi, or satellite to connect to the Internet or "the cloud". Some IoT related issues that blockchain may be able to detect include a lack of compliance in the manufacturing stage of an IoT device. For example, a blockchain may track whether an IoT device was adequately tested.

As discussed above, information from off-chain resources, including IoT devices, may be pushed to smart contracts via third party entities known as oracles. As an example, a smart refrigerator may monitor the use of an item stored in the refrigerator, such as milk. Various sensors within the refrigerator may be utilized for periodically determining an amount of milk stored in the refrigerator. A smart contract stored in a blockchain may indicate that if the weight of the stored milk falls below 10 ounces, then a new carton of milk is automatically purchased and delivered. The refrigerator sensors may periodically send their readings to a third-party service or oracle. The oracle may evaluate the sensor readings to determine whether the conditions for purchasing a new carton of milk have been met. Upon determining that the weight of the stored milk is below 10 ounces, the oracle may push information to the smart contract indicating that the condition for executing the smart contract has been met. The smart contract may be executed and a new carton of milk may be automatically purchased. Both the execution of the smart contract and the purchase of the new carton may be recorded in the blockchain. In some cases, the condition may be an occurrence of an event, such as a need or anticipated need, or convenience factors, such as a delivery day, cost, promotions, or incentives.

Some issues related to the integration of blockchain into IoT include speed of transactions and computational complexity. The speed at which transactions are executed on the blockchain may be important when IoT networks with hundreds or thousands of connected devices are all functioning and transacting simultaneously. IoT devices are generally designed for connectivity rather than computation and therefore, may not have the processing power to support a blockchain consensus algorithm, such as proof of work. IoT devices also tend to be vulnerable to hacking via the Internet and/or physical tampering. For example, IoT devices may be more vulnerable to DDoS and malware attacks. Hackers may target a specific network and begin spamming the network with traffic within a short amount of time. Because of the increased surge in traffic, the bandwidth may be quickly overloaded, and the entire system may crash.

Supply Chain Monitoring and Logistics

A supply chain for a product may include a network of entities and activities that are involved in the creation of the product and its eventual sale to a customer. A blockchain based record of the supply chain for a product may be utilized, for example, to trace the provenance of parts and materials and to prevent counterfeit parts from entering the supply chain. Blockchain integration into the supply chain for a product may utilize IoT devices and data, oracles, and smart contracts. For example, an RFID tag may be attached to a product in order to physically track the product and record its location within the supply chain. Additionally, smart contracts may be utilized to record the various activities and interactions between entities that are involved in the product's supply chain. As discussed above with reference to FIGS. 6A and 6B, any data or information that may be digitally represented and electronically stored may be recorded in a blockchain by submitting the data as part of a blockchain transaction. When the transaction is included in a validated block that is added to the blockchain, the transaction and its associated data is recorded in the blockchain.

As an example, a permissioned blockchain may be utilized for recording and monitoring the entities and activities involved in food distribution, such as fruit or vegetables. The blockchain may be accessible to entities, such as the suppliers of seed and pesticides, farmers, distributors, grocery stores, customers, and regulators. The blockchain may record activities such as the sale of a pesticide and/or seed to the farmer, the harvesting and packaging of the fruit, its shipment to distributors' warehouses, its arrival at various stores, and eventual purchase by a consumer. Sensors and RFID devices may be utilized for tracking the fruit through the supply chain. For example, the fruit may be packaged in crates tagged with a unique RFID device. When the tagged crate is loaded onto a truck for shipment from the farm to a distributor, the crate may be scanned, and a record of its shipment may be uploaded to the blockchain. When the crate arrives at a warehouse, it may be scanned again and a record of its arrival at the warehouse may be uploaded to the blockchain. Additionally, smart contracts may be executed throughout the supply chain. For example, when the crate is scanned at the warehouse, a smart contract between the farmer and the warehouse may be executed indicating that the crate was successfully shipped from the farmer to the warehouse and received by the warehouse.

As another example, a permissioned blockchain for an automobile may store a record of entities and activities related to a component that is utilized in the manufacturing of the automobile. The blockchain may be accessible to various entities, such as automobile OEMs, distributors and suppliers of materials and components, dealerships, mechanics, insurance providers, and others. While evaluating an accident involving a policy holder's automobile, first user 110 (an insurance provider 110 in this example) may determine that the accident may have been caused by a defective component used in a wheel of the automobile. The insurance provider 110 may wish to trace a provenance of the component based on information recorded in the permissioned blockchain. The insurance provider 110 may query the blockchain data for information related to the component via, for example, a blockchain querying application executing on the first client device 120. The query may include identifying information associated with the component. For example, the component may be marked with an identification that is unique to the component or a group of components. The results of the query may include records in the blockchain of the entities and activities that were involved in the creation of the component and its eventual sale to the automobile manufacturer.

Blockchain Enable In-Store Purchasing

Figure 8:
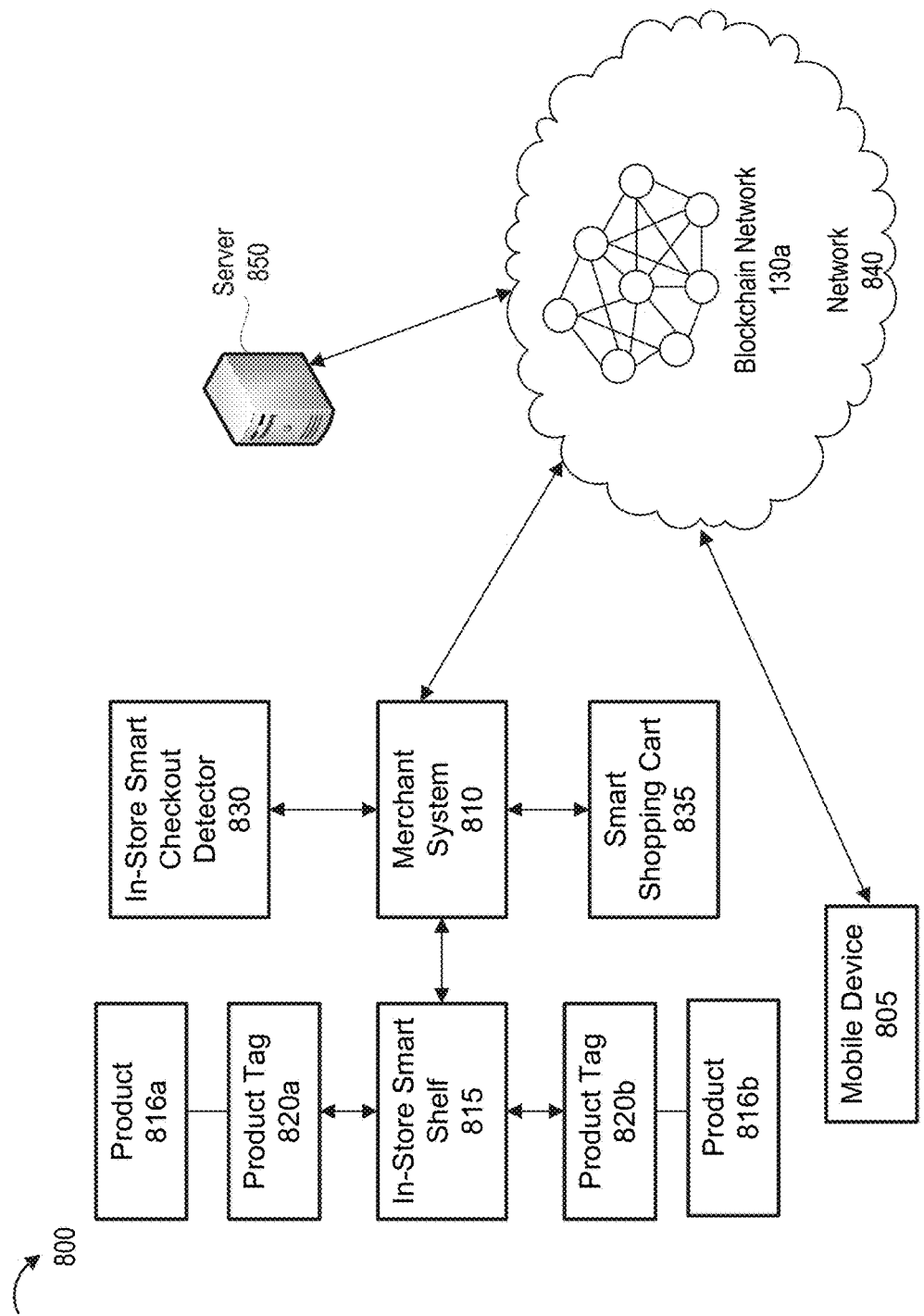
FIG. 8 illustrates an example of a blockchain enabled in-store purchase system according to an embodiment of the present disclosure.

An example of blockchain enabled in-store purchasing is described with reference to the system 800 shown in FIG. 8, the process 600 shown in FIG. 6A and the process 601 shown in FIG. 6B. FIG. 8 illustrates an example of a blockchain enabled in-store purchase system 800. The system 800 includes a mobile device 805, a merchant system 810, and a server 850 connected via a network 840. The merchant system 810 may be connected via a local wireless network to various IoT devices within a store, for example, an in-store smart shelf 815, and an in-store smart checkout detector 830.

The store may include one or more smart shelves, such as the in-store smart shelf 815. The smart shelf 815 may include an RFID tag, an RFID reader, and an antenna. One or more products may be stored on the in-store smart shelf 815. Each product may include an RFID tag, such as a first product tag 820a attached to a first product 816a and a second product tag 820b attached to a second product 816b. The in-store smart shelf 815 may, based on reading the product tags 820a and 820b, send information about the products 816a and 816b throughout the day to the merchant system 810. The merchant system 810 may in turn update an inventory of products currently within the store.

A shopper may travel through the store with the mobile device 805. A digital shopping list on the mobile device 805 may include a list of items that the shopper may need to purchase. For example, the shopping list may include an item that matches the first product 816a. When the shopper is close to the in-store smart shelf 815, the mobile device 805 may notify the shopper that the first product 816a is currently available on the in-store smart shelf 815. The shopper may remove the first product 816a from the in-store smart shelf 815 and place it into a smart shopping cart 835. The smart shopping cart 835 may read the first product tag 820a as well as the product tags attached to other products that may have been placed in the smart shopping cart 835. When the shopper is ready to checkout, the shopper may walk out of the store with the shopping cart 835. As the shopper walks out of the store, the in-store smart checkout detector 830 may detect the smart shopping cart 835. The smart shopping cart 835 may communicate with the in-store smart checkout detector 830 and transmit information about the products in the smart shopping cart. The in-store smart checkout detector 830 may send information about the products, such as the first product 816a, and payment information from the mobile device 805 to the merchant system 810. The merchant system 810 may receive information from the in-store smart checkout detector 830 and the payment information and proceed to initiate purchase of the first product 816a.

Referring to step 605 of the process 600 shown in FIG. 6A, a wallet application on the mobile device 805 may generate transaction data for transferring an amount of cryptocurrency matching the sale price of the first product 816a from the shopper to the merchant. The wallet application may generate a public key for the transaction using the private key of the shopper. In order to indicate that the shopper is the originator of the transaction, a digital signature may also be generated for the transaction using the private key of the shopper. The transaction data may be sent to the server 850 from the mobile device 805.

The server 850 may receive the transaction data from the mobile device 805. At step 610, the server 850 may broadcast the transaction to the blockchain network 130a. The transaction may be received by one or more nodes 205 of the blockchain network 130a. At step 615, upon receiving the transaction, a node 205 may choose to validate the transaction, for example, based on transaction fees associated with the transaction. If the transaction is not selected for validation by any of the nodes 205, then the transaction may be placed in a queue and wait to be selected by a node 205.

At step 620, each of the nodes 205 that selected the transaction may validate the transaction. At step 625, if the transaction is successfully validated by a node 205, the validated transaction is added, at step 630, to a block being constructed by that node 205. At step 635, the blockchain network 130a may wait for a block to be published. At step 640, if a block has not been published, then the process 600 returns to step 635 and waits for a block to be published. However, at step 640, if a block has been published, then the process 600 proceeds to step 645.

At step 645, the published block is broadcast to the blockchain network 130a for validation. At step 650, if the block is validated by a majority of the nodes 205, then at step 655, the validated block is added to the blockchain 220. At step 660, if the transaction was added to the blockchain 220, the server 850 may wait to receive a minimum number of blockchain confirmations for the transaction. At step 665, if the minimum number of confirmations for the transaction have not been received, then the process may return to step 660. However, if at step 665, the minimum number of confirmations have been received, then the process proceeds to step 670. At step 670, the transaction may be executed and the sale price of the first product 816a may be transferred from the shopper to the merchant.

When the in-store smart checkout detector 830 sends information about the products, such as the first product 816a, and payment information from the mobile device 805 to the merchant system 810, a smart contract may be created between the shopper and the merchant and executed according to the process 601 shown in FIG. 6B. For example, at step 676, a smart contract between the shopper and the merchant may be created and then submitted to the blockchain network 130a as a transaction. For example, at step 678, the process 601 may wait to receive notification that an amount of cryptocurrency equal to the sale price of the first product 816a was sent from a blockchain address associated with the shopper and was received at a blockchain address associated with the merchant by the time the first product 816a is removed from the smart shopping cart 835. If the payment for the first product 816a was successfully transferred from the shopper to the merchant by the time the shopper removes the first product 816a from the smart shopping cart 835, then an electronic receipt may be generated and sent to the shopper. Otherwise, the merchant system 815 may be alerted that the shopper is attempting to leave the premises without paying for the first product 816a.

Blockchain Enable In-Vehicle Purchasing

Figure 9:
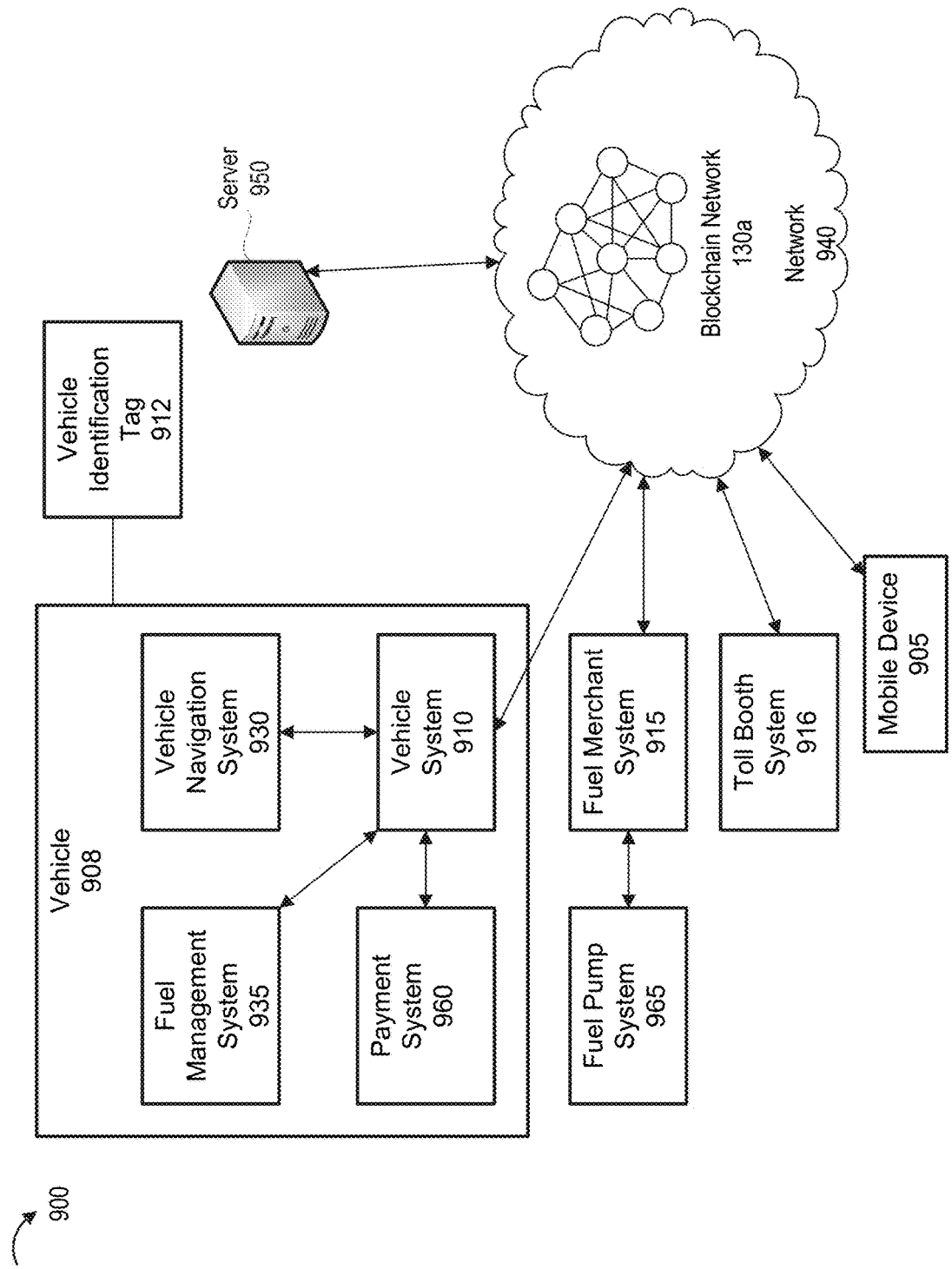
FIG. 9 illustrates an example of communications for an IoT blockchain enabled device system according to an embodiment of the present disclosure.

An example of blockchain enabled in-vehicle purchasing is described with reference to the system 900 shown in FIG. 9, the process 600 shown in FIG. 6A and the process 601 shown in FIG. 6B. FIG. 9 illustrates an example system 900 for blockchain enabled in-vehicle purchasing. The system 900 includes an IoT enabled smart vehicle 908. The vehicle 908 may include one or more computing devices implementing a vehicle system 910, a vehicle navigation system 930, a payment system 960 and a fuel management system 935. The vehicle 908 may include a RFID tag, such as a vehicle identification tag 912. The system 900 may also include various merchant systems, such as a fuel merchant system 915, and a toll booth system 916. The system 900 may also include a mobile device 905 belonging to a driver of the vehicle 908.

When the driver gets into the vehicle 908, payment information may be loaded from the driver's mobile device 905 into the vehicle payment system 910 so it is available for secure payments to other devices in order to complete in-vehicle purchases, such as in-vehicle purchase of fuel and in-vehicle payment of tolls. The driver of the smart vehicle may pay for parking, fast food, using the IoT enabled smart vehicle 908. Additionally, the IoT enabled smart vehicle 908 may also facilitate in-vehicle purchasing of smartphone apps, music, audio books, and other goods and services.

The fuel management system 935 may perform various functions related to fuel usage and communicate with the vehicle system 916. For example, the fuel management system 935 may monitor fuel usage and based on detecting that the fuel is below a threshold, notify the vehicle system 910. The vehicle system 910 may communicate with the vehicle navigation system 930 to determine nearby fuel stations. The selection of a fuel station to may be based on various factors, such as the availability of fuel at nearby fuel stations, the vehicle's current route and location, incentives that may be offered by nearby fuel stations, etc. The vehicle system 910 may notify the driver about the selection of a fuel station and the vehicle 908 may be re-routed to the selected fuel station. Upon arriving at the selected fuel station, the driver may pull up to a fuel pump. The fuel pump may include a fuel pump system 965 configured to detect the RFID tags of vehicles, such as the vehicle identification tag 912 in order to obtain an identification of the vehicles. The fuel pump system 965 and the payment system 960 may be configured to communicate with each other. The fuel payment system 960 may send payment information to the fuel pump system 965. After the driver has completed re-fueling, the driver may simply drive away. The fuel pump system 965 may send the fuel merchant system 915 information about the identification of the vehicle 908, the amount of fuel purchased, and the payment information. The fuel merchant system 915 may use the information to complete a transaction with the driver for the purchase of the fuel. For example, the fuel merchant system 915 may communicate with the server 950 to charge the driver for the fuel according to the process 600 shown in FIG. 6A. Additionally, the fuel merchant system 915 may communicate with the server 950 in order to create a smart contract between the driver and the fuel merchant. The smart contract may be created and executed according to the process 601 shown in FIG. 6B.

Augmented Reality (AR), Mixed Reality and Blockchain Based E-Commerce

AR or mixed reality enabled devices, such as wearable smart glasses, head mounted devices, holographic devices, or smartphone applications overlay digital content on top of a real world view, thus, enhancing a user's experience of the real world. The overlay content may be 3D models generated based on 3D scanning real world objects. AR enables users to experience online shopping in a virtual environment. For example, using AR, browse virtual stores and view 3D models of items for sale in virtual stores. Just as in the real world, customers may be able to handle and examine various physical details of the products. Blockchain smart contracts may be utilized to provide an e-commerce platform where customers may purchase items from online merchants with cryptocurrency and digital wallets. Information about a product, such as country of origin, materials, ingredients, price, description, measurements, terms and conditions, 3D model of the physical product, etc., may be hashed and recorded in a blockchain. This provides proof of ownership of virtual goods and products and enables accurate tracking of any changes made to this information. Artificial intelligence (AI) may be utilized for generating 3D models of products based on 2D images of the products. Smart contracts may be utilized to conduct transactions between merchants and customers.

As an example, a customer may shop for clothing by browsing different stores in a virtual shopping mall via a wearable AR device, such as a pair of smart glasses. The customer may examine a 3D model of a shirt as he or she would in the real world. Additionally, the customer may virtually try on the shirt using a 3D model of the customer's body. If the customer decides to purchase the shirt, the customer may initiate a transaction with the merchant of the store. A transaction may be submitted to the blockchain via the customer's digital wallet to transfer money (cryptocurrency) from the customer to the merchant. Various smart contracts may be utilized to implement various aspects of the e-commerce process. For example, based on detecting that the sale price of the shirt has been successfully transferred from the customer to the merchant, a smart contract may be executed to initiate shipment of the shirt from the merchant's warehouse to the customer. As described above with reference to supply chain monitoring and tracking, RFID tags and other IoT devices may be utilized to track the shipment of the shirt from the merchant's warehouse to the delivery of the shirt to the customer's residence.

Quantum Computing

One of the concerns of quantum computing is that it may increase the probability of breaking cryptographic algorithms and thus, weaken overall security for the blockchain. This may be addressed by requiring larger key sizes for some cryptographic algorithms or switching to quantum-proof algorithms. In some cases, if there is a concern that a block may be decrypted in the future, a dynamically changing cryptographic hash may be utilized. A different cryptographic hash may be dynamically selected for a particular block or the entire blockchain based on various factors, such as whether there is a concern that the block will be decrypted in the future, increasing a strength of the hash, utilizing a hash that is better suited for protecting privacy. In some cases, different cryptographic hashes may be selected for different blocks.

Anonymity and Privacy

As discussed above, the use of a private/public key pair to establish user authenticity during validation of a blockchain transaction provides some privacy as it does not reveal user identity. However, the transactions stored on a blockchain may be visible to the public. It has been shown that user identity may be derived from the publicly available transaction information.

Blockchain Size

Depending on a frequency at which events are recorded in a blockchain, the size of the blockchain may grow quickly. Computing/storage capacity (i.e., faster processors, larger storage components) may be needed to support the expansion of the blockchain. In some cases, blocks may be compressed prior to being added to the chain. In some cases, blocks may be eliminated, for example, at the beginning of the blockchain, when they become stale or irrelevant. As an example, a method for "replacing" the first 1000 transactions with a new block that effectively mimics the hash of the 1000 transactions may be useful for managing blockchain size.

Blockchain Immutability

In some cases, content in a blockchain may need to be deleted. For example, content may need to be deleted if there is a security breach or if the content is no longer relevant. A level of immutability of a blockchain may depend on a type of the blockchain. For example, changing content may be difficult in a public blockchain due to its possible impact on a large number of users. According to some techniques, data stored in a private blockchain, or a public blockchain controlled by a few entities may be changed by recording a flag (current block) where the change is being made, and adding the current block (referred to by the flag) to the blockchain. The added block may then indicate the change made to the previous block.

As another example, a blockchain may need to be changed to resolve a broken link. For example, the hash of a changed block may no longer match the hash stored in the block+1. In some cases, the blockchain may need to be changed in order to reverse the results of illegal transactions. In some cases, the blockchain may need to be changed to address software errors, erroneous transactions, or remove information that is confidential or required by law to be removed. If the blockchain is immutable, these errors and information may be permanently embedded in the blockchain. Additionally, the blockchain may need to be changed to comply with regulatory concerns, such as the European Union's incoming General Data Protection Regulation (GDPR), or California Consumer Privacy Act (CCPA), regarding consumer data privacy and ownership rights, US Fair Credit Reporting Act, and the SEC's "Regulation SP," which require that recorded user identifiable personal financial data be redactable.

Some techniques may allow modifications to the blockchain to address software errors, legal and regulatory requirements, etc., by allowing designated authorities to edit, rewrite or remove previous blocks of information without breaking the blockchain. Such techniques may enable blockchain editing by using a variation of a "chameleon" hash function, through the use of secure private keys. This editing may allow smart contracts that were flawed at issue to be updated so that the changes carry over to subsequent smart contracts in the blockchain. Using these techniques, blocks that have been changed may be using a "scar" or mark that cannot be removed, even by trusted parties.

According to some techniques, when a block is hashed, any confidential information, such as personally identifiable information, and IP addresses, is not included in the block because it is not part of the data values that were hashed. But because there is no hash of the confidential information, it may be changed. According to some techniques, the confidential information may not be placed or recorded into the blockchain. Rather the information may reside in a file that is external to the blockchain. A hash of that file, however, may be recorded in the blockchain. For example, a user's confidential information may be deleted locally without affecting the blockchain.

As another example, assuming that all content included in a block in a blockchain cannot be changed after a block is added to the blockchain, a determination may be made before adding data to the blockchain of whether some or all of that data may need to be deleted at a later time. For example, confidential information (i.e., data to be deleted at a later time) may be stored as a file that is external to the block and the blockchain. For the purposes of creating the block, a link to the file containing the confidential information and a hash of the file containing the confidential information file may be added to the block. An example of a link would be an HTTP link. During confirmation of the block that is to be added to the blockchain, the network nodes may be able to access the confidential information and verify that the confidential information based on the hash value of the file in the block. Because the hash value of the file is a part of the block, the file containing the confidential information may not be easily changed. However, it may be possible to change the confidential information file by changing the data therein and adding a nonce. This may seek to change the nonce until the resulting hash equals the hash that is stored in the blockchain. However, this would be difficult (probably near impossible), and an inspection of the modified confidential information file would reveal the added nonce, which may then raise suspicion that information was changed since it was first added to the blockchain.

Files containing confidential information may be encrypted (e.g., through an asymmetric key encryption function) prior to the hashing operation. When "deleting" the confidential information, the file containing the confidential information may be deleted or removed resulting in the link, which is stored in the blockchain, being ineffective for retrieving the file. The hash of the file, and the link, remain in the blockchain so that the linking of the blocks through hash functions is not affected. However, because of this change, a transaction that is part of the block or part of a different special block could be added to the blockchain to indicate that the link is no longer effective and the confidential information file is no longer part of the blockchain. This may effectively keep confidential information out of the blockchain while providing the confidential information to users of the blockchain and proof of authenticity of the confidential information before it is deleted from the blockchain. This may come with drawbacks because access to data implies that such data may be stored. Accordingly, those with access to the confidential information file, while it was part of the blockchain, may have stored that information in another location that may no longer be reachable during the "deleting" operation discussed above.

51% Attack

A "51% attack" refers to an individual mining node or a group of mining nodes controlling more than 50% of a blockchain network's mining power, also known as hash rate or hash power. The hash rate is a measure of the rate at which hashes are being computed on the blockchain network. As described above, hashing may include taking an input string of a given length, and running it through a cryptographic hash function in order to produce an output of a fixed length. A blockchain network's hash rate may be expressed in terms of 1 KH/s (kilohash per second) which is 1,000 hashes per second, 1 MH/s (megahash per second) which is 1,000,000 hashes per second, 1 TH/s (terahash per second) which is 1,000,000,000,000 hashes per second, or 1 PH/s (petahash per second) which is 1,000,000,000,000,000 hashes per second. As an example, a mining node in a blockchain utilizing a proof of work consensus model (PoW) may perform hashing in order to find a solution to a difficult mathematical problem. The hash rate of the mining node may depend on the computational resources available to that node. A mining node that successfully solves the mathematical problem may be able to add a block to the blockchain. Thus, by ensuring that invalid transactions cannot be included in a block, mining nodes increase the reliability of the network. Transactions may be deemed invalid if they attempt to spend more money than is currently owned or engage in double spending. If a mining node intentionally or unintentionally includes an invalid transaction in a block, then the block will not be validated by the network. Additionally, nodes that accept the invalid block as valid and proceed to add blocks on top of the invalid block will also end up wasting computational resources. Thus, mining nodes are discouraged from cheating by intentionally adding invalid transactions to blocks and accepting invalid blocks as valid.

Figure 7A:
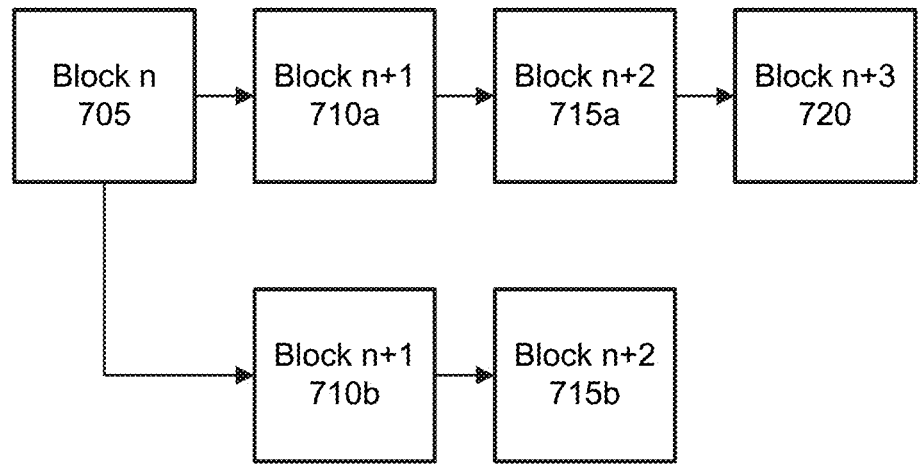
FIG. 7A shows an example of a privately broadcasted blockchain according to an embodiment of the present disclosure.
Figure 7B:
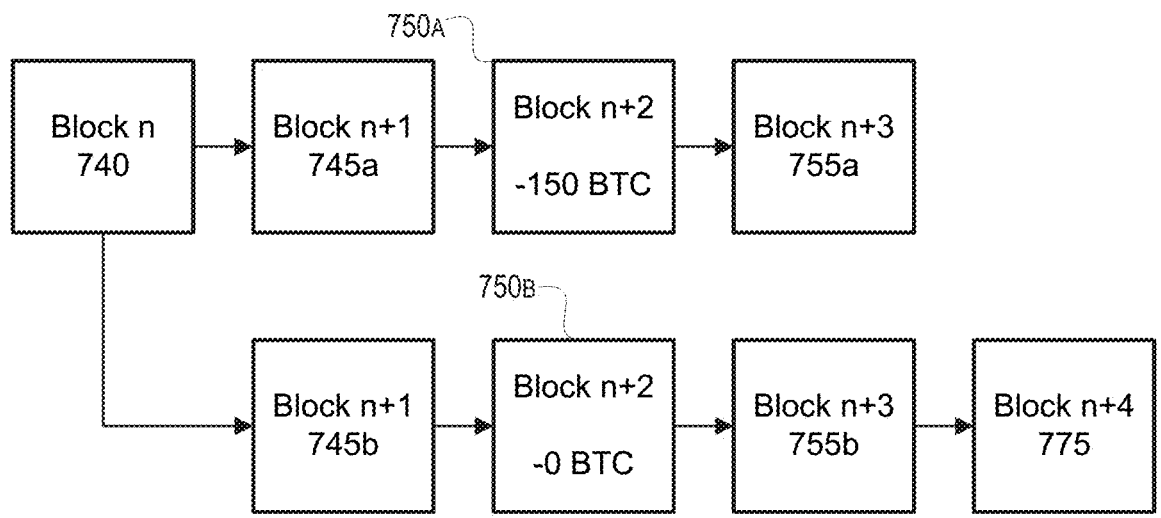
FIG. 7B shows an example of a blockchain misuse according to an embodiment of the present disclosure.

An entity may be able to disrupt the network by gaining control of 50% of a network's hash rate. In a 51% attack, a blockchain node may intentionally reverse or overwrite transactions and engage in double spending. When a node generates a valid block of transactions, it broadcasts the block to the network for validation. In some cases, a node controlling more than 50% of a network's hash rate may mine blocks in private without broadcasting them to the network. In such a scenario, the rest of the network may follow a public version of the blockchain while the controlling node may be following its private version of the blockchain. FIG. 7A shows a fraudulent and valid version of a blockchain 700. The valid blockchain on the top comprises the valid blocks 705, 710a, 715a, and 720. The fraudulent blockchain on the bottom is not broadcast to the network and includes the blocks 705, 710b, 715b, and an invalid block 720, FIG. 7B shows another fraudulent and valid version of a blockchain. The valid version of the blockchain includes nodes 740, 745a, 750a, and 755a, The fraudulent version of the blockchain includes nodes 740, 745b, 750b, 755b, and 775. However, following the longest chain rule, the network may select and utilize the private or fraudulent blockchain comprising nodes 740, 745b, 750b, 755b and 775. Since it is the longest chain, previous transactions may be updated according to this chain. The cheating node may include transactions that spend money, such as the block 750b including the transaction for 150 BTC, on the public or fraudulent version of the blockchain without including these transactions in the private version of the blockchain. Thus, in the private version of the blockchain, the cheating node may continue to own the spent 150 BTC. When the cheating node controls more than 50% of the hashing resources of the network, it may be able to broadcast its private version of the blockchain and continue to create blocks on the private blockchain faster than the rest of the network, thus, resulting in a longer blockchain. Since there are two versions of the blockchain, the network may select the longest or fraudulent private blockchain as the valid blockchain. As a result, the rest of the network may be forced to use the longer blockchain. The public or valid version of the blockchain may then be discarded or abandoned and all transactions in this blockchain that are not also in the private or fraudulent version of the blockchain may be reversed. The controlling or cheating node may continue to own the spent money because the spending transactions are not included on the fraudulent version of the blockchain, and the cheating node may therefore, spend that money in future transactions.

Because of the financial resources needed to obtain more hashing power than the rest of the entire network combined, a successful 51% attack may generally be challenging to achieve. However, it would be less expensive to achieve a 51% attack on a network with a lower hash rate than one with a higher hash rate. Additionally, the probability of a successful 51% attack increases with the use of mining pools in which multiple nodes may combine their computational resources, for example, when mining is performed from the same mining pool.

Computing Device

Figure 10:
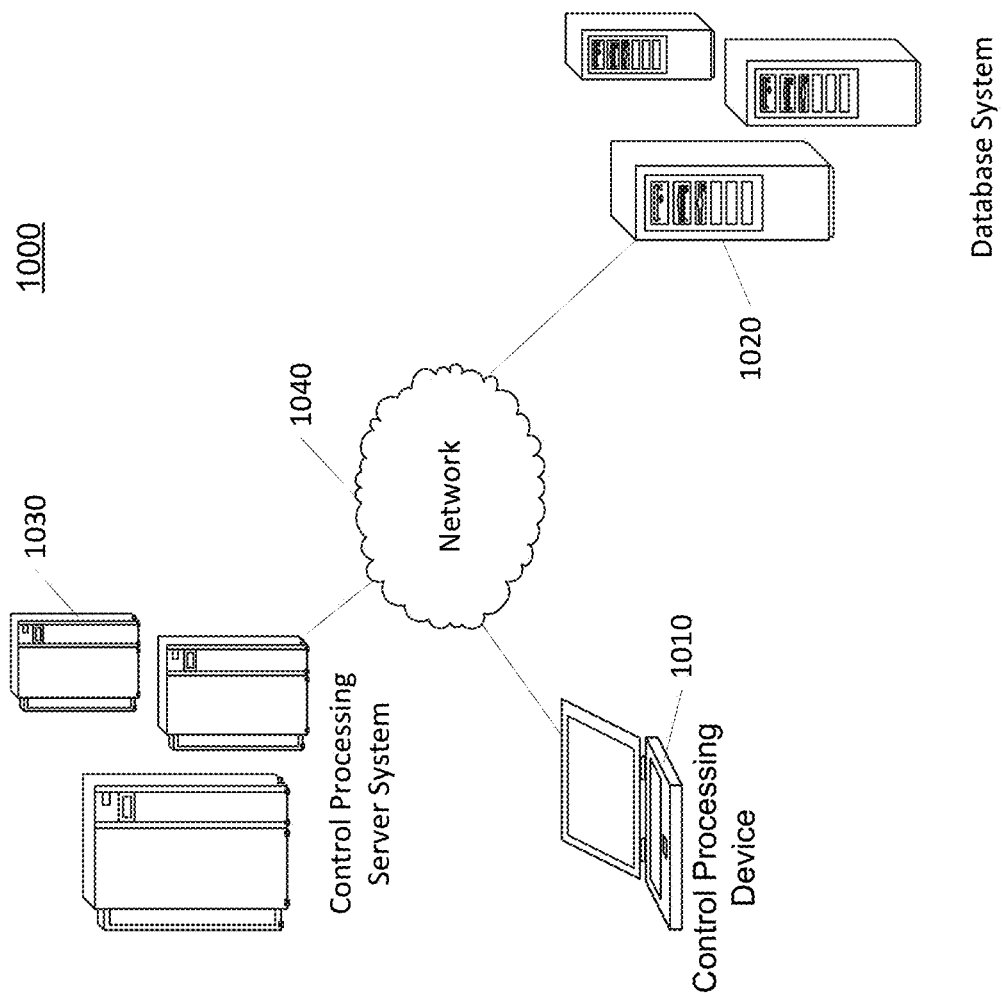
FIG. 10 illustrates an example system according to an embodiment of the present disclosure.

FIG. 10 shows a system 1000. The system 1000 may include at least one client device 1010 (also referred to as "control processing device"), at least one database system 1020, and/or at least one server system 1030 in communication via a network 1040. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 10.

Client device 1010 may access server applications and/or resources using one or more client applications (not shown) as described herein. Client device 1010 may be a mobile device, such as a laptop, smart phone, mobile phones, or tablet, or computing devices, such as a desktop computer or a server, wearables, embedded devices. Alternatively, client device 1010 may include other types of devices, such as game consoles, camera/video recorders, video players (e.g., incorporating DVD, Blu-ray, Red Laser, Optical, and/or streaming technologies), smart TVs, and other network-connected appliances, as applicable.

Database system 1020 may be configured to maintain, store, retrieve, and update information for server system 1030. Further, database system 1020 may provide server system 1030 with information periodically or upon request. In this regard, database system 1020 may be a distributed database capable of storing, maintaining, and updating large volumes of data across clusters of nodes. Database system 1020 may provide a variety of databases including, but not limited to, relational databases, hierarchical databases, distributed databases, in-memory databases, flat file databases, XML databases, NoSQL databases, graph databases, and/or a combination thereof.

Server system 1030 may be configured with a server application (not shown) that is capable of interfacing with client application and database system 1020 as described herein. In this regard, server system 1030 may be a stand-alone server, a corporate server, or a server located in a server farm or cloud-computer environment. According to some examples, server system 1030 may be a virtual server hosted on hardware capable of supporting a plurality of virtual servers.

Network 1040 may include any type of network. For example, network 1040 may include a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies.

The data transferred to and from various computing devices in a system 1000 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 1000. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 1000 in front of one or more computing devices such that any external devices may communicate directly with the specialized hardware.

Figure 11:
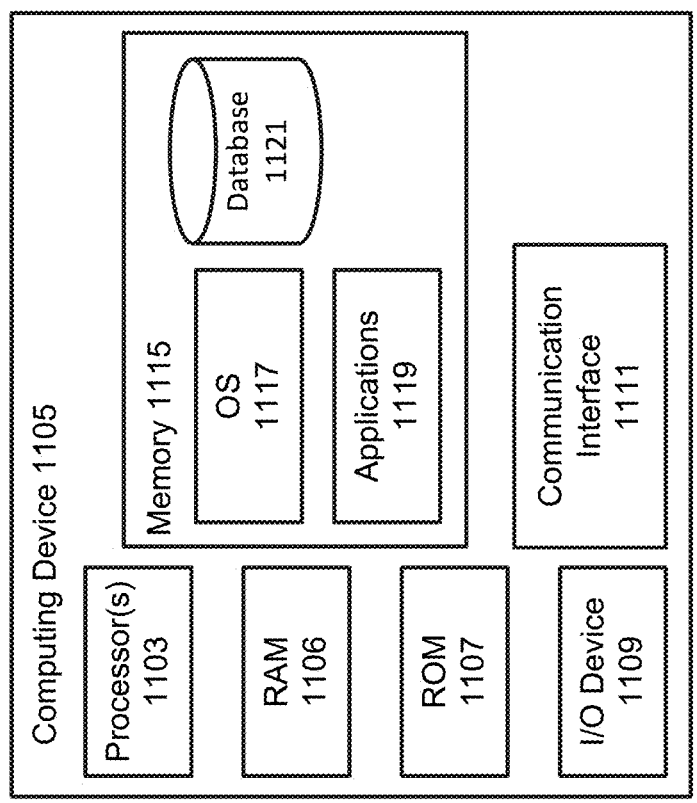
FIG. 11 illustrates an example computing device according to an embodiment of the present disclosure.

Turning now to FIG. 11, a computing device 1105 that may be used with one or more of the computational systems is described. The computing device 1105 may include a processor 1103 for controlling overall operation of the computing device 1105 and its associated components, including RAM 1105, ROM 1107, input/output device 11011, communication interface 1111, and/or memory 1115. A data bus may interconnect processor(s) 1103, RAM 1106, ROM 1107, memory 1115, I/O device 1109, and/or communication interface 1111. In some embodiments, computing device 1105 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 1109 may include a microphone, keypad, touch screen, and/or stylus motion, gesture, through which a user of the computing device 1105 may provide input, and may also include one or more of a speaker for providing audio output and a video display device for providing textual, audiovisual, and/or graphical output. Software may be stored within memory 1115 to provide instructions to processor 1103 allowing computing device 1105 to perform various actions. For example, memory 1115 may store software used by the computing device 1105, such as an operating system 1117, application programs 1119, and/or an associated internal database 1121. The various hardware memory units in memory 1115 may include volatile and nonvolatile, removable and non-removable media implemented in any method or technology for storage of information such as computer-readable instructions, data structures, program modules, or other data. Memory 1115 may include one or more physical persistent memory devices and/or one or more non-persistent memory devices. Memory 1115 may include, but is not limited to, random access memory (RAM) 1106, read only memory (ROM) 1107, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 1103.

Communication interface 1111 may include one or more transceivers, digital signal processors, and/or additional circuitry and software for communicating via any network, wired or wireless, using any protocol as described herein.

Processor 1103 may include a single central processing unit (CPU), which may be a single-core or multi-core processor, or may include multiple CPUs. Processor(s) 1103 and associated components may allow the computing device 1100 to execute a series of computer-readable instructions to perform some or all of the processes described herein. Although not shown in FIG. 11, various elements within memory 1115 or other components in computing device 1105, may include one or more caches, for example, CPU caches used by the processor 1103, page caches used by the operating system 1117, disk caches of a hard drive, and/or database caches used to cache content from database 1121. For embodiments including a CPU cache, the CPU cache may be used by one or more processors 1103 to reduce memory latency and access time. A processor 1103 may retrieve data from or write data to the CPU cache rather than reading/writing to memory 1115, which may improve the speed of these operations. In some examples, a database cache may be created in which certain data from a database 1121 is cached in a separate smaller database in a memory separate from the database, such as in RAM 1106 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 1105 are described separately, functionality of the various components may be combined and/or performed by a single component and/or multiple computing devices in communication without departing from the invention.

DESCRIPTION OF EMBODIMENTS OF THE INVENTION

When a transaction is performed using Bitcoin, or other blockchain-based protocol or currency, the transaction is entered into a memory pool, which is referred to herein as a mempool. The mempool is a database of unconfirmed pending transactions which every node in a blockchain network keeps. All transactions in the mempool will not be trusted until they are included in a block. A transaction may stay pending in the mempool until it can be bundled into a block and cryptographically confirmed by miners in the blockchain network. Typically, transactions are confirmed every ten minutes or so for Bitcoin transactions, but they may be confirmed quicker or slower in various other blockchains.

Oftentimes a situation arises in which a transaction is not included in the next block on the blockchain or even the one after that, and so forth. After a duration of time and/or after a number of blocks are confirmed but none of which include a confirmation of the transaction, the transaction may be considered "stuck" in the mempool. Generally, a stuck transaction is a side effect of congestion on the blockchain network. Congestion typically occurs because there has been a sudden spike in transactions sent to the mempool or because the hashrate has suddenly dropped. The hashrate may refer to the total computational power being used to process transactions and mine new coins. The hashrate may drop for various reasons including power cuts, natural disasters, and hardware availability among others.

Unfortunately, congestion has become a regular and expected problem for blockchains using Bitcoin or other cryptocurrencies to process transactions. When a blockchain network is congested, those who paid the highest fees (e.g., ratio of fee to transaction size, e.g., satoshis per byte or sat/byte) are prioritized as each submitted transaction has to compete with other transactions for inclusion in one of the blocks in the future (e.g., blockspace). If the fee paid by a user to conduct a transaction on the blockchain is below the average fee rate at the time of sending the transaction to the mempool, there could be significant delays until the transaction is confirmed, because miners are motivated by profits and transactions that pay more than other transactions are preferred when mining a new block. The more congested the blockchain network, the more a user will have to pay in fees to have a transaction confirmed, and so the average fee for conducting transactions on the blockchain shifts upwards during high congestion periods.

A "Child Pays for Parent" transaction allows a user (e.g., a receiver of transaction output of a stuck transaction) to pay to make an incoming stuck transaction (the "Parent") more desirable to miners. The user may do so by sending a second transaction (the "Child") to the mempool, where the Child spends an output of the Parent to be mined with a higher fee. Bitcoin consensus rules require that the transaction which creates an output(s) must appear earlier in the blockchain than the transaction which spends the output(s)—including having the Parent transaction appear earlier in the same block than the Child transaction if both are included in the same block. As the Child transaction can only be confirmed after the original Parent has been confirmed, miners will see and calculate the overall fee for both the Parent and Child transactions and take a less profitable transaction (the stuck Parent) in order to mine the more profitable transaction (the Child with the higher fee). Thus, the miner is encouraged to process both transactions. This will not guarantee the stuck Parent transaction will be included in the next block, but it may increase the probability that it is included in the next block or is at least confirmed faster by being included in a block earlier rather than later. Typically, the overall fee for both the Parent and Child transactions will have to be significantly above an average fee in order for Child Pays for Parent transaction to work.

Since the Bitcoin blockchain's original inception, it has supported the concept that an unconfirmed transaction in the mempool may be modified and re-issued. This concept is known as "transaction replacement" because the new transaction replaces the old one. However, since transaction replacement eliminates the cost to all previous transactions being replaced, it created a Denial-of-Service (DoS) risk: attackers could produce as many transactions as they wanted, while only paying the fee for the one variant that was eventually mined. To solve this problem, the concept of "Replace by Fee" was developed. Replace by Fee requires replacement transactions to pay for not only its own cost, but also the fee of the transactions being replaced; thus the DoS risk is strictly less than the risk of flooding the mempool with separate transactions.

The Replace by Fee approach can be used to make a transaction unstuck by letting a user pay a fee to change the fee on the stuck transaction. An unconfirmed transaction in a mempool is replaced with a different transaction that spends at least one of the same inputs and which pays a higher transaction fee. To illustrate, consider a user who makes a transaction with a fee of 1 sat/byte, a lowest possible amount. The transaction sits in the mempool for days with zero confirmations until the user realizes that the transaction is not going to be confirmed any time soon. Rather than wait, the user may broadcast a new transaction that is identical to the previous stuck transaction but incorporates a higher fee. By mining the new transaction, a miner will get the fee of the new transaction which should be strictly greater than the sum of the fees of the replaced transaction and descendant transactions of the replaced transaction, if any, that also get replaced/dropped. Miners will typically pick up the replacement transaction if the fee is higher than the original transaction on an absolute basis and a per byte basis.

However, Child Pays for Parent and Replace by Fee have technical limitations that do not allow for their use for every case in which a transaction gets stuck. For example, one problem with Child Pays for Parent is that certain blockchain protocols, by default, limit the use of Child transactions. The limit for the number of ancestors/descendants is often put in place so that the mempool does not get flooded with useless transactions that would never make it into the blockchain. For example, Bitcoin Core, by default, limits transaction chains such that a transaction will not enter a Bitcoin Core node's mempool if it has more than 25 ancestors, or more than 25 descendants (Child transactions). Thus, a scenario that often happens is a number of Child transactions do not go through to be included in the blockchain (they may have very small fees and are not selected by miners) and the Parent transaction is stuck. As a result, the Parent transaction and the number of Child transactions become stuck, and Child Pays for Parent cannot be used as a remedy because the number of child transactions already meets the limit of the blockchain protocol (e.g., sending another Child transaction would exceed the 25 ancestor/descendant limit).

The above technical limitation of Child Pays for Parent is especially pronounced in the context of a cryptocurrency exchange platform. For example, an exchange platform will typically conduct a single transaction that serves multiple users such as when 25 users want to exchange Bitcoin (e.g., during a withdrawal), the exchange oftentimes will conduct a single transaction and has a plurality of transaction outputs that go to the users. The users could then use those transaction outputs in descendant/Child transactions before the Parent transaction can be mined/confirmed. In this case, if there are too many Child transactions (e.g., more than the technical limit under the blockchain protocol, such as 25 ancestor/descendant limit) and the Parent transaction is stuck, Child Pays for Parent will not be available for use to get the Parent transaction unstuck. The number of Child transactions that meets the limit typically happens before the Parent transaction is realized to be stuck.

In the above case, Replacement by Fee would also not be available because if the original Parent transaction is stuck, a replacement transaction fee, along with the original Parent transaction fee, would have to be high enough to pay for itself as well as all of the Child transactions, because if there is already Child transaction(s) that depends on the original, stuck, Parent transaction, the later Child transactions will be discarded as their inputs cease to exist. Thus, a miner will only accept the replacement transaction if its fee, and the original transaction fee, is greater than the chain of Child transactions. In practice, Replacement by Fee becomes too exorbitant in such scenarios to use as a method to unstick a transaction.

The present disclosure provides systems and methods that provide an efficient solution that solves the problem of stuck blockchain transactions, such as in situations where Parent Pays for Child or Replacement by Fee are not suitable.

Figure 12:
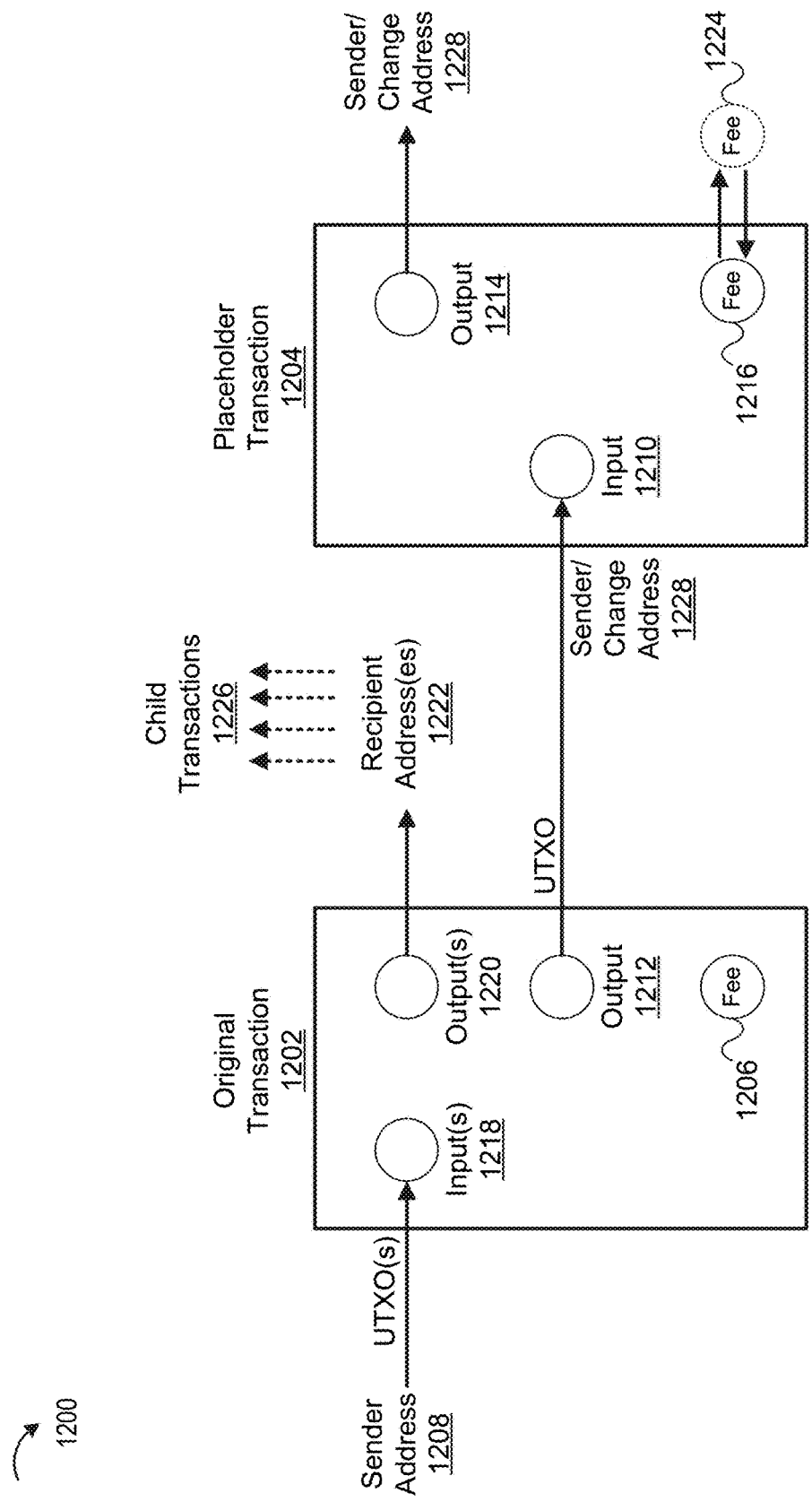
FIG. 12 illustrates an example diagram corresponding to a prophylactic solution for stuck transactions according to one or more embodiments of the present disclosure.

Referring now to FIG. 12, illustrated is an example diagram 1200 corresponding to a prophylactic solution for stuck transactions. An original transaction 1202 may be broadcast to a blockchain network for inclusion into a block in a blockchain. For example, the original transaction 1202 may be sent to a mempool to be selected by a miner node for inclusion in a block of the blockchain. The original transaction 1202 may use, as input(s) 1218, unspent transaction output(s) (UTXO(s)) sourced from a sender address 1208 corresponding to a sending entity. The original transaction 1202 may have output(s) 1220 directing cryptocurrency to recipient address(es) 1222 and an output 1212 directing change to a sender address 1228, which could be a transaction "change" address that is controlled by the sender corresponding to the sender address 1208 or, in some embodiments, the same address as sender address 1208. As an illustration, the original transaction 1202 may be requested by a cryptocurrency exchange platform to send cryptocurrency to recipient address(es) 1222, which may correspond to clients of the cryptocurrency exchange platform.

The original transaction 1202 may be broadcast with a fee 1206 that the sending entity selects (automatically or manually) based on the current fee environment for the blockchain network. For example, the fee 1206 may be approximately the current average or median fee rate in the blockchain network for transactions in the mempool.

Immediately following the broadcast of the original transaction 1202 (e.g., less than three or so seconds), a placeholder transaction 1204 may be broadcast to the blockchain network for inclusion into the block in the blockchain. For the placeholder transaction 1204, an input 1210 may include an output 1212 (e.g., "change") from the original transaction, thus the placeholder transaction 1204 creates a descendent transaction from the original transaction 1202. For example, the input 1210 may be sourced from a change address of the 1228, which may be an address that is controlled/owned by the sender corresponding to the sender address 1208 and receives change from the original transaction 1202. The output 1214 for the placeholder transaction 1204 may be directed back to the sender/change address 1228. Thus, the sender is using the transaction change (UTXO from output 1212) from the original transaction 1202 and sending it back to itself in the placeholder transaction 1204.

Initially, a placeholder fee 1216 for the placeholder transaction 1204 may be a nominal amount selected such that the placeholder transaction 1204 is unlikely to be selected by a miner for inclusion in a block. For example, the placeholder fee 1216 may be a threshold amount lower than the average fee rate for the blockchain network, the lowest possible fee rate for the blockchain network that would allow the placeholder transaction to be admitted to the mempool, or some other fee rate that would likely result in the placeholder transaction being dropped from a node's mempool if it runs out of space (e.g., the placeholder transaction would eventually be discarded after not being validated/confirmed for a block after a certain period of time).

Under normal circumstances (e.g., no or low congestion on the blockchain network), the original transaction 1202 would not get stuck. However, there may be instances where the original transaction 1202 is determined to be stuck in the mempool. For example, the blockchain network may be determined to be congested based on significant delays (e.g., beyond a threshold duration) that the transaction is experiencing as it is pending confirmation due to miners selecting other transactions from the mempool when mining new blocks. The presence of congestion may further be determined based on an upward shift of transaction fees for transactions in the mempool (e.g., exceeding a threshold shift) as users begin to pay more in processing fees to have their transactions confirmed in the blockchain.

While there is congestion in the blockchain network, further consider a scenario in which there is already a large number of Child transactions 1226 descending from the original transaction 1202, which could be very likely if the sending entity is a cryptocurrency exchange platform that has provided cryptocurrency to a large number of outputs that correspond to clients. For example, the clients will quickly begin performing transactions of their own using the cryptocurrency from outputs 1220, which could grow to meet the limit of ancestor/descendent transactions very quickly, even before the original transaction 1202 has been confirmed in the blockchain. Since there may already a number of Child transactions 1226 that exceeds a maximum ancestor/descendant transaction limit permitted for the blockchain protocol, Child Pays for Parent will not be available to make the original transaction 1202 unstuck. Further, Replace by Fee on the original transaction 1202 will not be available as it will be exorbitantly expensive, since the replacement fee will need to be enough to pay for the replacement transaction, the original transaction 1202, and all of the Child transactions 1226 that descend from the original transaction 1202.

Therefore, as a solution to unstick the original transaction 1202, the placeholder fee 1216 of the placeholder transaction 1204 may be replaced with a greater fee 1224 (e.g., a high fee) by overriding the placeholder transaction 1204 with a transaction that includes the greater fee 1224. The placeholder transaction 1204 may be replaced because it does not have any Child transactions descending from itself. In other words, since the placeholder transaction 1204 does not have Child transactions, Replace by Fee can be used on the placeholder transaction 1204 to make the original transaction 1202 unstuck. The greater fee 1224 may be a suitable fee rate to encourage miners to select the original transaction 1202 and the new transaction, which replaces the placeholder transaction 1204, for inclusion into a block in the blockchain.

The output of the placeholder transaction 1204 should not be used to avoid creating descendent transactions to the placeholder transaction 1204. In the case where the original transaction 1202 is not stuck, the output of the placeholder transaction 1204 would not be realized because the placeholder transaction 1204 would not be mined.

In some embodiments, the greater fee 1224 may be calculated by using the (fee of the placeholder transaction 1204+fee of the stuck original transaction 1202)/(length in bytes of the placeholder transaction 1204+length in bytes of the stuck original transaction 1202) which should be greater than the current fee that will allow the stuck transaction to be included into the next block.

Figure 13:
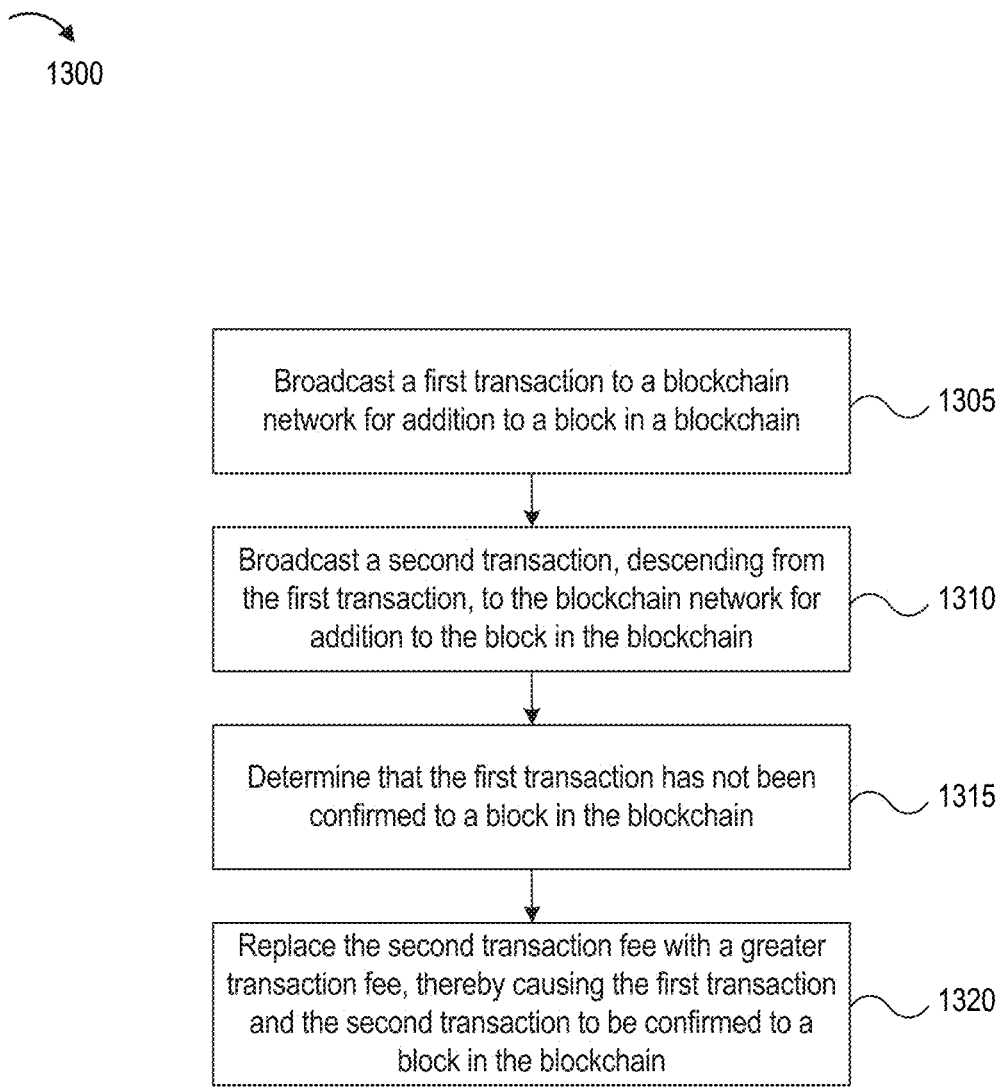
FIG. 13 illustrates a flowchart showing a process for unsticking blockchain transactions according to one or more embodiments of the present disclosure.

Referring now to FIG. 13, illustrated is a flow diagram of a process 1300 for unsticking blockchain transactions in accordance with embodiments of the present disclosure. The blocks of process 1300 are described herein as occurring in serial, or linearly (e.g., one after another). However, multiple blocks of process 1300 may occur in parallel. In addition, the blocks of process 1300 need not be performed in the order shown and/or one or more of the blocks of process 1300 need not be performed.

It will be appreciated that first, second, third, etc. are generally used as identifiers herein for explanatory purposes and are not necessarily intended to imply an ordering, sequence, or temporal aspect as can generally be appreciated from the context within which first, second, third, etc. are used.

In some embodiments, various operations of the process 1300 may be performed by a computer system having at least a non-transitory memory (e.g., a machine-readable medium) and one or more hardware processors configured to read instructions from the non-transitory memory to cause the system to perform the process 1300. For example, the computer system may include one or more computer devices 1105 of FIG. 11.

At block 1305, the computer system may broadcast a first transaction to a blockchain network for addition to a block in a blockchain. For example, the first transaction may be sent to a mempool for the blockchain network from which miner nodes in the blockchain network select transactions to be included in a next block of the blockchain.

The first transaction may be considered an original transaction as discussed above in reference to FIG. 12. The first transaction may include a sender address, one or more recipient addresses, and a first transaction fee. In some embodiments, the computer system may determine what fee/fee rate to use for the first transaction fee based on the transaction fees associated with other transactions that are currently pending in the mempool for the blockchain and/or a current block time. For example, the computer system may probe the other transactions queued for processing in the mempool and determine an average or median fee rate for transactions pending in the mempool. The computer system may use the average or median fee rate for the first transaction fee. In another example, the computer system may determine that the current block time is greater than a threshold duration, and thus may determine to use a fee rate that is greater than the average or median fee rate for the pending transactions in the mempool. The block time may refer to the measure of time it takes to produce a new block in the blockchain.

At block 1310, the computer system may broadcast a second transaction to the blockchain network for addition to the block in the blockchain. For example, the second transaction may be sent to the mempool for the blockchain network. The computer system may select an output from the first transaction to be included as an input of the second transaction such that the second transaction descends from the first transaction. For example, the output from the first transaction may be the transaction change or unspent transaction output (UTXO) from the first transaction.

The second transaction may be broadcast such that the second transaction does not have descendant transactions, which allows the second transaction, and its fee, to be replaced at a future time if needed. For example, implementations of a UTXO crypto-wallet may include a type of input selection algorithm so that descendant transactions are not created from the second transaction. However, even if a crypto-wallet does allow for selecting individual inputs, most wallets generate new change addresses for every outgoing transaction—so the first transaction may have an output in a discrete address, which can be specified as the source for the second transaction, so control is not needed over the input selection, just over the source address selection, which is standard in any enterprise wallet. Assuming this basic control over the source addresses is available, creating new transactions using the second transaction's source address can be avoided such that no descendant transactions would be created.

The second transaction may be considered a placeholder transaction as discussed above in reference to FIG. 12.

Initially, the second transaction may include a nominal fee, which may act as a placeholder fee in case the first transaction becomes stuck in the mempool. The nominal fee may be selected such that the second transaction is unlikely to be selected by a miner for inclusion in a block. For example, the nominal fee may be a threshold amount lower than the average fee rate for the blockchain network, a lowest possible fee rate for the blockchain network that would allow the second transaction to still be admitted to the mempool, and/or another fee rate that would likely result in the placeholder transaction being dropped from a node's mempool if it runs out of space. If the first transaction is confirmed in the blockchain, the nominal fee should be selected such that the second transaction is eventually discarded from the mempool after not being validated/confirmed for a block after a certain period of time. In this regard, the second transaction exists for the purpose of acting has a placeholder in the event that the first transaction becomes stuck in the mempool.

At block 1315, the computer system may determine that the first transaction has not been confirmed to the block in the blockchain. In some embodiments, in order to be confirmed, a number of blocks must be added to the blockchain after a block that includes the transaction is added to the blockchain. In some embodiments, the number of blocks for the confirmation may be changed to suit a desired application. For example, a higher number of confirmations may provide more certainty that the first transaction has been included in the blockchain, while a lower number of confirmations may provide less certainty that the first transaction has been included in the blockchain.

In some embodiments, the computer system may monitor the blockchain to determine that the first transaction has not been confirmed to a block in the blockchain for a duration of time. The determination that the first transaction has not been confirmed to the block in the blockchain may be based on a lack of the confirmation and a lapse of the duration of time. For example, the duration of time may be a number of blocks that have been added to the blockchain and which do not include the first transaction. As another example, the duration of time may be a period of time such as a number of minutes, hours, days, weeks, etc. (e.g., 30 minutes, 2 hours, 4 days, 1 week).

In some embodiments, the computer system may determine a mempool size (e.g., mempool transaction count) for the mempool. The computer system may further determine that the mempool size exceeds a predefined threshold indicating that the blockchain network is congested. In further embodiments, the computer system may determine a block time for the blockchain exceeds a predefined threshold (or a frequency of blocks being added to the blockchain does not meet a predefined threshold), which may also indicate that the blockchain network is congested. In response to the first transaction not being confirmed and/or the determination that the blockchain network is congested, the computer system may proceed to block 1320, according to various embodiments.

At block 1320, the computer system may replace the second transaction fee with a greater transaction fee, thereby causing the first transaction and the second transaction to be included in and confirmed to a block in the blockchain. For example, the computer system may send a signal to the blockchain network to replace the second transaction with a new transaction that is similar to the second transaction but has the second transaction fee replaced with a greater transaction fee. In some embodiments, the greater transaction fee may include a higher fee rate and a higher absolute fee than the fee rate and absolute fee of the second transaction.

In some embodiments, the computer system may probe other transactions queued for processing in the mempool for the blockchain network and determine what to use for the greater fee based on the fees associated with the other transactions. For example, the computer system may probe the other transactions queued for processing in the mempool and determine the average or median fee rate for transactions pending in the mempool. The computer system may use the average or median fee rate as a basis for determining the greater fee. For example, the computer system may use a fee rate for the greater fee such that the greater fee and the first transaction fee overall is greater than the average or median fee rate for the pending transactions in the mempool.

By replacing the second transaction with a new transaction that has a greater fee, miner nodes in the blockchain network will be encouraged to select the new transaction with the replacement fee and the first transaction from the mempool for inclusion in a block of the blockchain. Once the miner finds a solution to the consensus algorithm, it may broadcast its candidate block, which includes the first transaction and the new transaction, to other nodes in the blockchain network to verify the validity of the solution and execute each transaction of the block. The new proposed block may be added to the blockchain if the majority of miners agree, as discussed in the present disclosure.

Therefore, the present disclosure provides an efficient solution to unstick the first transaction, such as when the blockchain network is experiencing network congestion.

Figure 14:
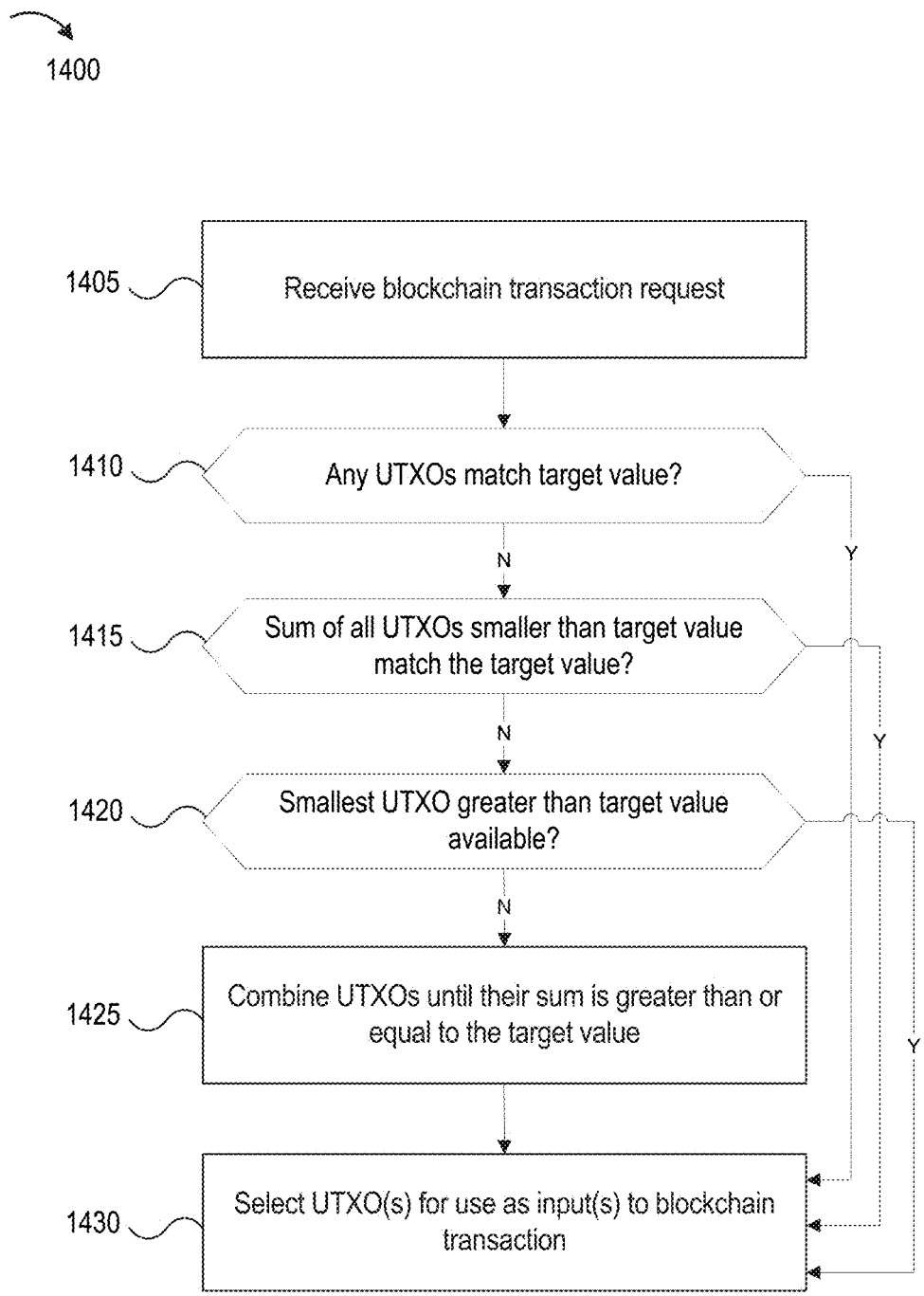
FIG. 14 illustrates a flowchart showing a process for selecting inputs for blockchain transactions according to one or more embodiments of the present disclosure.

Referring now to FIG. 14, illustrated is a flow diagram of a process 1400 for input selection for blockchain transactions in accordance with embodiments of the present disclosure. The blocks of process 1400 are described herein as occurring in serial, or linearly (e.g., one after another). However, multiple blocks of process 1400 may occur in parallel. In addition, the blocks of process 1400 need not be performed in the order shown and/or one or more of the blocks of process 1400 need not be performed.

When creating a blockchain transaction, a determination may be made as to which unspent transaction outputs (UTXOs) to be used as inputs in the blockchain transaction as the transaction fees for the blockchain transaction may be related to the inputs used. Further, the resulting transaction output(s) that is created from the blockchain transaction should also be considered when selecting UTXOs as inputs. For example, if the transaction inputs go over a target value (e.g., outgoing amount plus transaction fees), there will be an output in the form of "change." A change output that is too small may be considered uneconomical to spend as it could cost more in transaction fees than it is worth (e.g., "dust"). In general, avoiding change outputs will produce a smaller transaction, and thus, will result in less transaction fees.

However, a desired change output may be included in the target value so that it may be used in a placeholder transaction as discussed in the present disclosure. In other words, selecting which inputs to use for the blockchain transaction may depend on whether a placeholder transaction will be requested. For example, where a placeholder transaction is determined to be put in place, an input selection algorithm can select inputs for an original transaction that would provide a minimum change value that can be outputted to a change address that is under control of a sender in the original transaction. Since the sender would have control of the change address (e.g., ownership of the private keys corresponding to the change address), the output of the original transaction is effectively sent back to the sender of the original transaction (e.g., the sender is also an output recipient of the original transaction). The output of the original transaction can be selected by the sender (e.g., by specifying the change address as a source) for the input in the placeholder transaction. In some embodiments, the minimum value for change that is used for the placeholder transaction may be greater than the minimal dust level for the blockchain (e.g., around 500 Satoshis for Bitcoin). In some embodiments, bigger inputs can be selected for an original transaction so that the minimum value of change outputted by the original transaction produces the minimal dust value to produce a placeholder transaction. In some cases, an extra input can be used for the original transaction beyond what is needed to have the original transaction processed so that there is sufficient change to use as an output in the placeholder transaction, so that the placeholder transaction can be used in the future in the event that the original transaction gets stuck.

At block 1405, a computer system may receive a blockchain transaction request to send cryptocurrency from a sending address to a recipient address.

At block 1410, the computer system may determine if any UTXOs for the sending address match a target value for the blockchain transaction. If there is a UTXO for the sending address that matches the target value, the computer system may select the UTXO for use as an input for submitting the blockchain transaction for inclusion in a blockchain at block 1430.

If there are no UTXOs that match the target value at block 1410, the computer system may proceed to block 1415.

At block 1415, the computer system may determine if a sum of all of the UTXOs for the sending address, that are smaller than the target value, match the target value. For example, the computer system may sweep the digital wallet address to find all of the UTXOs less than the target value and determine whether their sum matches the target value. If the sum of all the UTXOs, that are smaller than the target value, matches the target value, the computer system may select said UTXOs for use as inputs to the blockchain transaction at block 1430.

If the sum of all UTXOs, smaller that the target value, for the sending address, does not match the target value at block 1415, the computer system may proceed to block 1420.

At block 1420, the computer system may determine if there is a smallest UTXO for the sending address that is greater than the target value and is available for use as an input in the blockchain transaction. For example, a UTXO may be available if it has a sufficient number of confirmations from a previous transaction for which it was an output (e.g., threshold of 1, 2, 3, etc.).

Since the computer system may want to avoid creating a change output that is too small, the computer system may compute whether there is a smallest UTXO available that would create a change output that is above a minimum change amount. For example, the computer system may only use a UTXO that is greater than the target value if it would create a change output that is greater than a threshold amount (e.g., 0.01 Bitcoin).

If there is a smallest UTXO that exceeds the target value and would not create change less than the threshold amount, the computer system may select the UTXO for use as in input to the blockchain transaction at block 1430.

If there is not a smallest UTXO that is greater than the target value and is available, the computer system may proceed to block 1425.

At block 1425, the computer system may search for and combine UTXOs for the sending address until the computer system finds a combination in which the sum of UTXOs in the combination is greater than or equal to the target value.

For example, if the computer system determines a combination that matches the target value, the computer system may select the UTXOs in the combination for use as inputs to the blockchain transaction at block 1430.

If the computer system is not able to determine a combination that matches the target value, the computer system may determine a combination that results in a sum that is greater than the target value plus any minimum change output. The computer system may then select the combination that results in the sum that is greater than the target value plus any minimum change output for use as inputs in the blockchain transaction at block 1430.

In some embodiments, the computer system may combine UTXOs in a random fashion at block 1425 in searching for a combination that is greater than or equal to the target value until a combination(s) that satisfies the desired condition(s) is discovered.

In various embodiments, when performing operations of process 1400, the computer system may first consider UTXOs that have had a sufficient number of confirmations. For example, the computer system may consider UTXOs that have had at least six confirmations before less certain UTXOs that have less confirmations. In some cases, as the computer system performs multiple passes over the available UTXOs, the computer system may reduce the required number of confirmations before a UTXO is considered for the new blockchain transaction. For example, on first pass, six confirmations may be required for a UTXO to be considered, whereas on a second pass, five confirmations may be required, and so forth.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A computer system comprising:
   a non-transitory memory storing instructions; and
   one or more hardware processors configured to execute the instructions and cause the computer system to perform operations comprising:
      broadcasting a first transaction to a blockchain network for addition to a block in a blockchain, wherein the first transaction comprises a first input sourced from a sender address, a first output to a recipient address, and a first transaction fee;
      broadcasting a second transaction to the blockchain network for addition to the block in the blockchain, wherein the second transaction is a placeholder transaction of the first transaction and comprises the first output sourced from the recipient address as a second input to the second transaction, a second output to the recipient address, and a second transaction fee, wherein the second transaction is broadcasted such that the second transaction does not have descendant transactions, which allows the second transaction fee to be replaced by a greater transaction fee;
      monitoring a status of the first transaction with respect to a mempool of the blockchain;
      determining, based on the monitoring indicating that the first transaction has not been confirmed to the block in the blockchain for a duration of time, that the first transaction is at least temporarily stuck in the mempool; and
      in response to determining that the first transaction is at least temporarily stuck in the mempool, automatically transmitting a request to the blockchain to replace the second transaction with a new transaction having a same structure as the second transaction but with a third transaction fee greater than the second transaction fee, thereby causing the first transaction and the new transaction to be confirmed to the block in the blockchain.

2. The computer system of claim 1, wherein the operations further comprise:
   probing other transactions queued for processing in the mempool for the blockchain network; and
   determining the third transaction fee based on fees associated with the other transactions.

3. The computer system of claim 1, wherein the third transaction fee is calculated at least in part based on a length in bytes of the first transaction or a length in bytes of the second transaction.

4. The computer system of claim 1, wherein the operations further comprise determining a mempool size for the mempool of the blockchain network, wherein the replacing the second transaction is based on the mempool size exceeding a predefined threshold.

5. The computer system of claim 1, wherein the operations further comprise determining a current frequency of blocks mined for the blockchain, wherein the replacing the second transaction is based on the current frequency failing to meet a predefined threshold.

6. The computer system of claim 1, wherein the second transaction is broadcasted to the blockchain network within a specified time period after the broadcasting of the first transaction.

7. The computer system of claim 6, wherein the third transaction fee includes a higher fee rate and a higher absolute fee than a fee rate and an absolute fee of the second transaction fee.

8. A method comprising:
   broadcasting, by a computer system, a first transaction to a blockchain network for addition to a block in a blockchain, wherein the first transaction comprises a first input sourced from a sender address, a first output to a recipient address, and a first transaction fee;
   broadcasting, by the computer system, a second transaction to the blockchain network for addition to the block in the blockchain, wherein the second transaction comprises the first output sourced from the recipient address as a second input to the second transaction, a second output to the recipient address, and a second transaction fee, and wherein the second transaction is prevented from having descendant transactions;
   determining, by the computer system, that the first transaction is unconfirmed and pending in a mempool for the blockchain network for a period of time exceeding a specified threshold;
   determining, by the computer system and based on the determining that the first transaction is unconfirmed and pending in the mempool for the period of time exceeding the specified threshold, that the first transaction has become stuck in the mempool; and
   replacing, by the computer system, the second transaction with a third transaction having an identical structure as the second transaction but with a third transaction fee greater than the second transaction fee, thereby causing the first transaction and the third transaction to be confirmed to the block in the blockchain.

9. The method of claim 8, further comprising:
   probing other transactions queued for processing in the mempool; and
   determining the third transaction fee based on fees associated with the other transactions.

10. The method of claim 8, wherein the third transaction fee is calculated at least in part based on a length in bytes of the first transaction or a length in bytes of the second transaction.

11. The method of claim 8, further comprising determining a mempool transaction count for the mempool of the blockchain network, wherein the replacing the second transaction is based on the mempool transaction count exceeding a predefined threshold.

12. The method of claim 8, further comprising determining a current frequency of blocks mined for the blockchain, wherein the replacing the second transaction is based on the current frequency failing to meet a predefined threshold.

13. The method of claim 8, wherein the second transaction is broadcasted to the blockchain network within a specified time window after the broadcasting of the first transaction.

14. The method of claim 8, wherein the third transaction fee includes a higher fee rate and a higher absolute fee than a fee rate and an absolute fee of the second transaction fee.

15. A non-transitory machine-readable medium having instructions stored thereon, wherein the instructions are executable to cause a machine of a system to perform operations comprising:
   broadcasting a first transaction to a blockchain network for addition to a block in a blockchain, wherein the first transaction comprises a first input sourced from a sender address, a first output to a recipient address, and a first transaction fee;
   broadcasting a second transaction, as a placeholder transaction, to the blockchain network for addition to the block in the blockchain, wherein the second transaction comprises the first output sourced from the recipient address as a second input for the second transaction, a second output to the recipient address, and a second transaction fee, and wherein the second transaction does not have a descendant transaction;
   determining, based on a pending status of the first transaction in a mempool for the blockchain network for a time period exceeding a specified threshold, that the first transaction is at least temporarily stuck in the mempool; and
   based on the determining that the first transaction is at least temporarily stuck in the mempool, replacing the second transaction with a third transaction having an identical structure as the second transaction but has a third transaction fee greater than the second transaction fee, thereby facilitating a confirmation of the first transaction and the third transaction in the blockchain.

16. The non-transitory machine-readable medium of claim 15, wherein the operations further comprise:
   probing other transactions queued for processing in the mempool for the blockchain network; and
   determining the third transaction fee based on fees associated with the other transactions.

17. The non-transitory machine-readable medium of claim 15, wherein the third transaction fee is calculated at least in part based on a length in bytes of the first transaction or a length in bytes of the second transaction.

18. The non-transitory machine-readable medium of claim 17, wherein the operations further comprise determining a mempool size for the mempool of the blockchain network, wherein the replacing the second transaction is based on the mempool size exceeding a predefined threshold.

19. The non-transitory machine-readable medium of claim 15, wherein the operations further comprise determining a current frequency of blocks mined for the blockchain, wherein the replacing the second transaction is based on the current frequency failing to meet predefined threshold.

20. The non-transitory machine-readable medium of claim 15, wherein the third transaction fee includes a higher fee rate and a higher absolute fee than a fee rate and an absolute fee of the second transaction fee.

* * * * *